US006921999B1

(12) United States Patent
Stridsberg

(10) Patent No.: US 6,921,999 B1
(45) Date of Patent: Jul. 26, 2005

(54) ELECTRIC MOTOR

(75) Inventor: Lennart Stridsberg, Stockholm (SE)

(73) Assignee: Stridsberg Innovation AB, Stockholm (SE)

(*) Notice: Subject to any disclaimer, the term of this patent is extended or adjusted under 35 U.S.C. 154(b) by 0 days.

(21) Appl. No.: 09/889,784

(22) PCT Filed: Jan. 21, 2000

(86) PCT No.: PCT/SE00/00138

§ 371 (c)(1),
(2), (4) Date: Oct. 19, 2001

(87) PCT Pub. No.: WO00/44084

PCT Pub. Date: Jul. 27, 2000

(30) Foreign Application Priority Data

| Jan. 21, 1999 | (SE) | 9900204 |
| Jul. 14, 1999 | (SE) | 9902726 |
| Aug. 10, 1999 | (SE) | 9902884 |
| Aug. 25, 1999 | (SE) | 9903025 |

(51) Int. Cl.$^7$ .................. H02K 33/00; H02K 21/12
(52) U.S. Cl. .................. 310/156.01; 310/264
(58) Field of Search .................. 335/69; 310/15, 310/36, 254, 156.05, 261, 67 R, 186, 156, 154; 360/264.9, 265

(56) References Cited

U.S. PATENT DOCUMENTS 4,031,419 A * 6/1977 Spiesberger et al. ...... 310/49 R
4,181,868 A * 1/1980 Grosu ...................... 310/166

(Continued)

FOREIGN PATENT DOCUMENTS

| DE | 198 16 201 A 1 | * 10/1998 |
| EP | 0 127 058 | * 12/1984 |
| EP | 0 238 317 | * 9/1987 |
| JP | 61-154471 | * 7/1986 |

OTHER PUBLICATIONS

US 5,030,868, 7/1991, Suzuki et al. (withdrawn)*

Primary Examiner—Darren Schuberg
Assistant Examiner—Heba Elkassabgi
(74) Attorney, Agent, or Firm—Birch, Stewart, Kolasch & Birch, LLP

(57) ABSTRACT

An electromagnetic rotary actuator is driven by a single-phase voltage. Permanent magnets on a rotor interact over a part-cylindrical small airgap with a soft-iron stator having pole teeth that carry at least one winding for rotating the rotor within a limited angular range, the airgap having a high flux density. The windings are applied around those of the pole teeth that are centrally located. The permanent magnets and stator poles have the same angular pitch. The actuator is compact having a low total length and has a high output power/loss ratio and allows a fast response. It can be built with a low thermal resistance to an enclosure or casing by having the coils being in direct mechanical contact therewith.

96 Claims, 12 Drawing Sheets

U.S. PATENT DOCUMENTS

| | | | |
|---|---|---|---|
| 4,521,709 A | * | 6/1985 | Saint-Michel et al. ...... 310/178 |
| 4,755,703 A | * | 7/1988 | Ueno .......................... 310/12 |
| 4,879,486 A | * | 11/1989 | Yumiyama ................... 310/254 |
| 4,980,593 A | * | 12/1990 | Edmundson ........... 310/154.21 |
| 5,095,238 A | * | 3/1992 | Suzuki et al. .......... 310/156.46 |
| 5,329,267 A | * | 7/1994 | Endoh et al. .......... 310/154.21 |
| 5,432,644 A | * | 7/1995 | Tajima et al. ............ 360/99.04 |
| 5,448,437 A | * | 9/1995 | Katahara .................... 360/265 |
| 5,459,362 A | * | 10/1995 | Dunfield et al. ............... 310/13 |
| 5,537,270 A | * | 7/1996 | Morehouse et al. ..... 360/97.02 |
| 5,608,592 A | * | 3/1997 | Mizoshita et al. ....... 360/256.2 |
| 5,621,591 A | * | 4/1997 | Rahimi et al. .............. 360/265 |
| 5,654,848 A | * | 8/1997 | Maiers et al. ........... 360/97.01 |
| 5,675,455 A | * | 10/1997 | Matsumoto .............. 360/256.2 |
| 5,694,272 A | * | 12/1997 | Bang ........................ 360/264.2 |
| 5,698,911 A | * | 12/1997 | Dunfield et al. ............... 310/12 |
| 5,708,406 A | * | 1/1998 | Tsunoda et al. ............. 335/272 |
| 5,729,071 A | * | 3/1998 | Steiner ....................... 310/254 |
| 5,739,614 A | * | 4/1998 | Suzuki et al. ............... 310/180 |
| 5,763,976 A | * | 6/1998 | Huard ......................... 29/598 |
| 5,780,944 A | * | 7/1998 | Sakamoto ................. 310/49 R |
| 5,798,583 A | * | 8/1998 | Morita ........................ 310/42 |
| 5,883,761 A | * | 3/1999 | Kasetty et al. ........... 360/264.9 |
| 5,914,836 A | * | 6/1999 | Pottebaum ............... 360/264.8 |
| 5,940,247 A | * | 8/1999 | Karis et al. ............... 310/67 R |
| 6,043,574 A | * | 3/2000 | Prudham .................. 310/49 R |
| 6,064,132 A | * | 5/2000 | Nose ......................... 310/216 |
| 6,160,330 A | * | 12/2000 | Sakamoto ................... 310/112 |
| 6,169,350 B1 | * | 1/2001 | Yang ......................... 310/216 |
| 6,188,159 B1 | * | 2/2001 | Fan ............................ 310/254 |
| 6,201,322 B1 | * | 3/2001 | Heine et al. ................ 310/179 |
| 6,313,553 B1 | * | 11/2001 | Gandel et al. ................ 310/36 |
| 6,362,553 B1 | * | 3/2002 | Nakahara et al. ........... 310/254 |
| 6,437,962 B1 | * | 8/2002 | Muraji ........................ 361/170 |
| 6,603,635 B1 | * | 8/2003 | Suzuki et al. ............. 360/99.04 |
| 6,717,314 B2 | * | 4/2004 | Horst et al. ............ 310/156.43 |
| 6,741,006 B2 | * | 5/2004 | Sakamoto ................... 310/254 |

\* cited by examiner

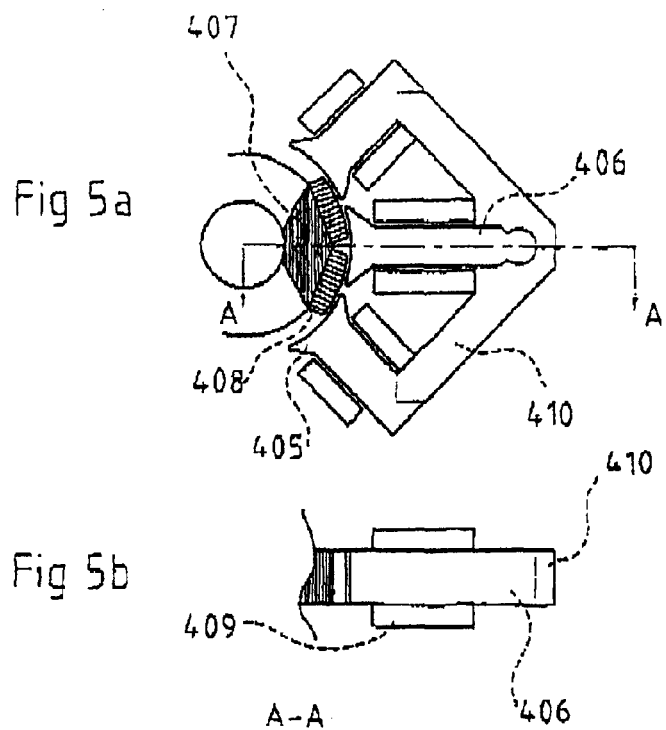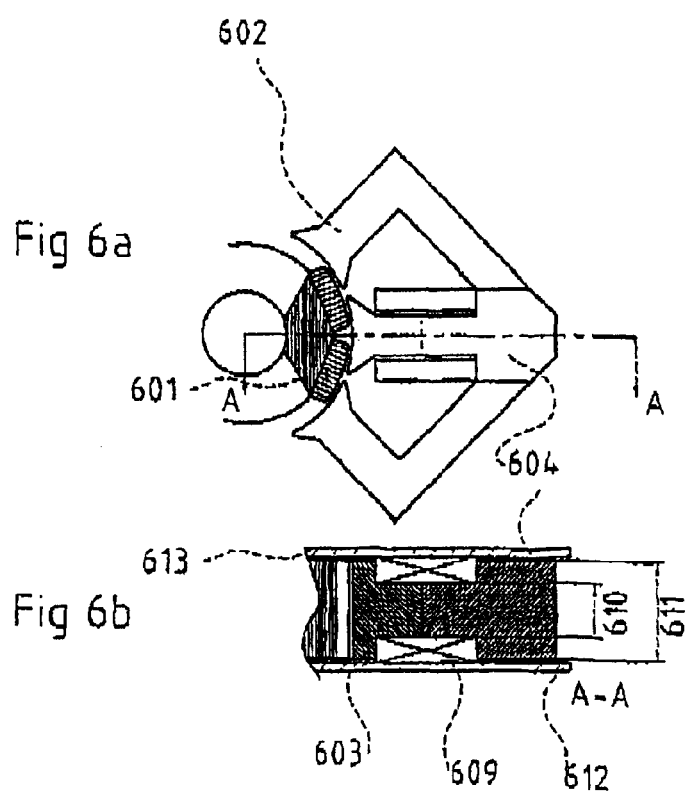

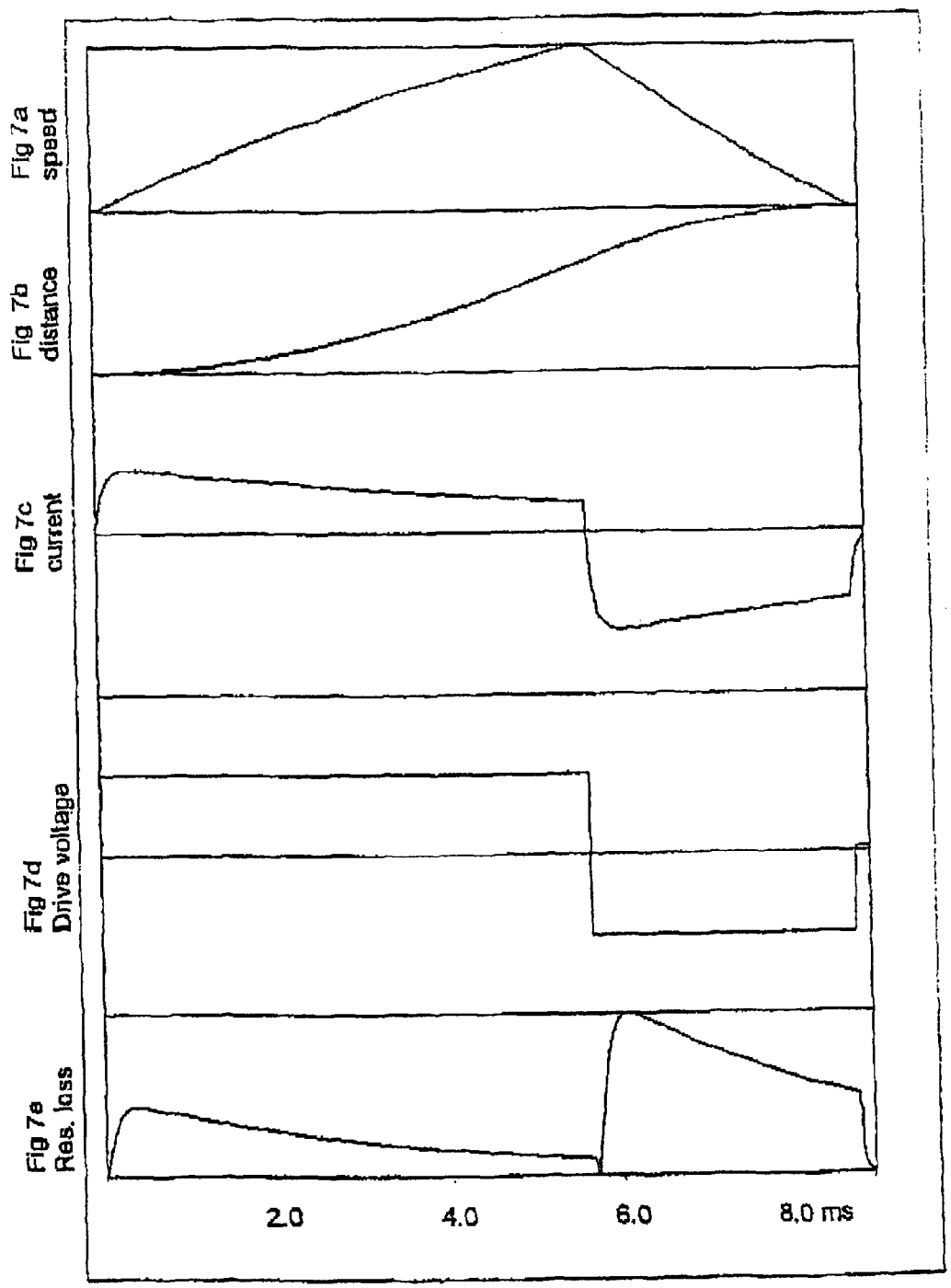
dist = 0.2 rad    t = 9.0ms    Loss = 2.6mJ

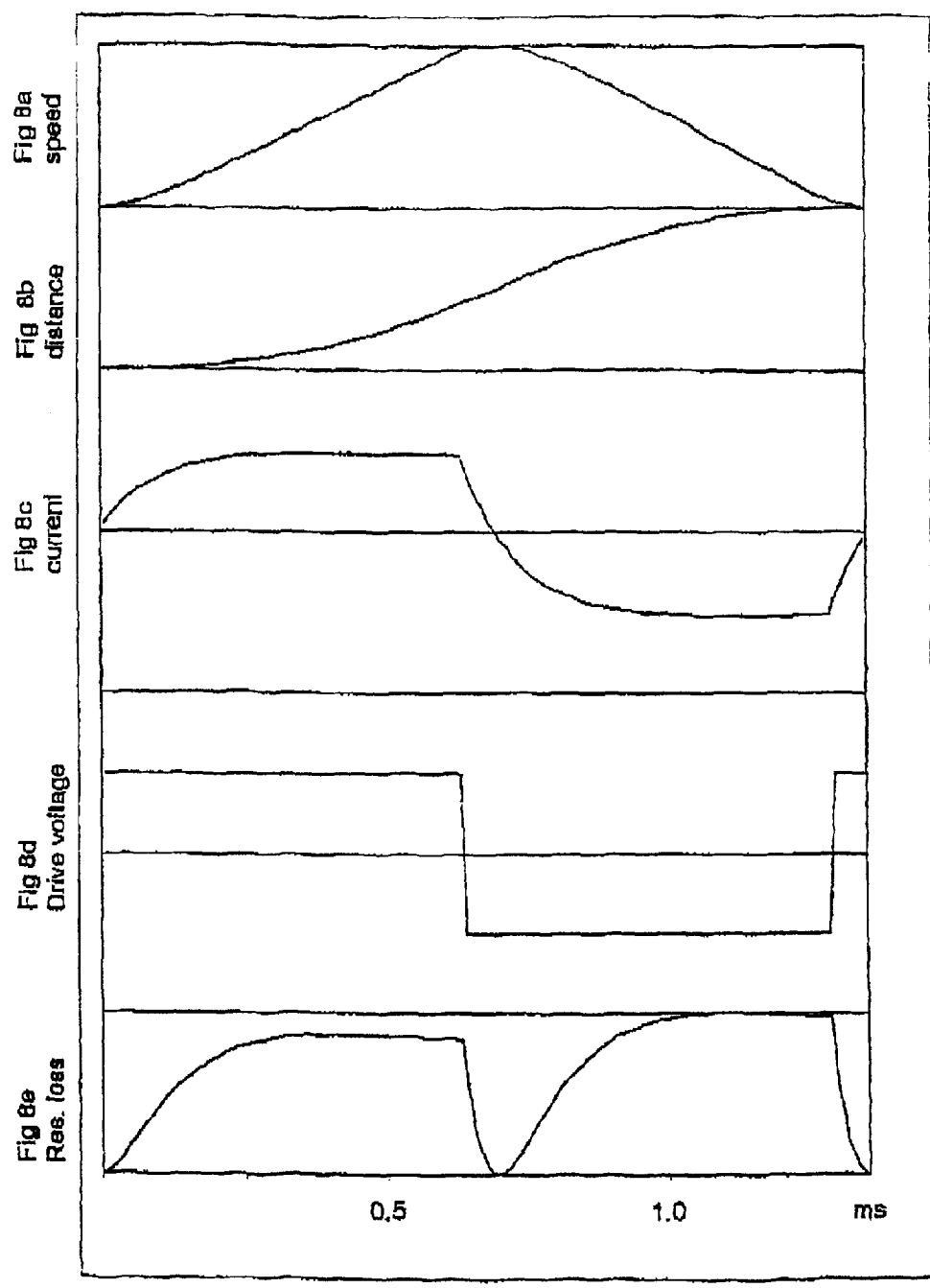
dist = 0.004 rad   t = 1.34 ms   Loss = 0.33 mJ

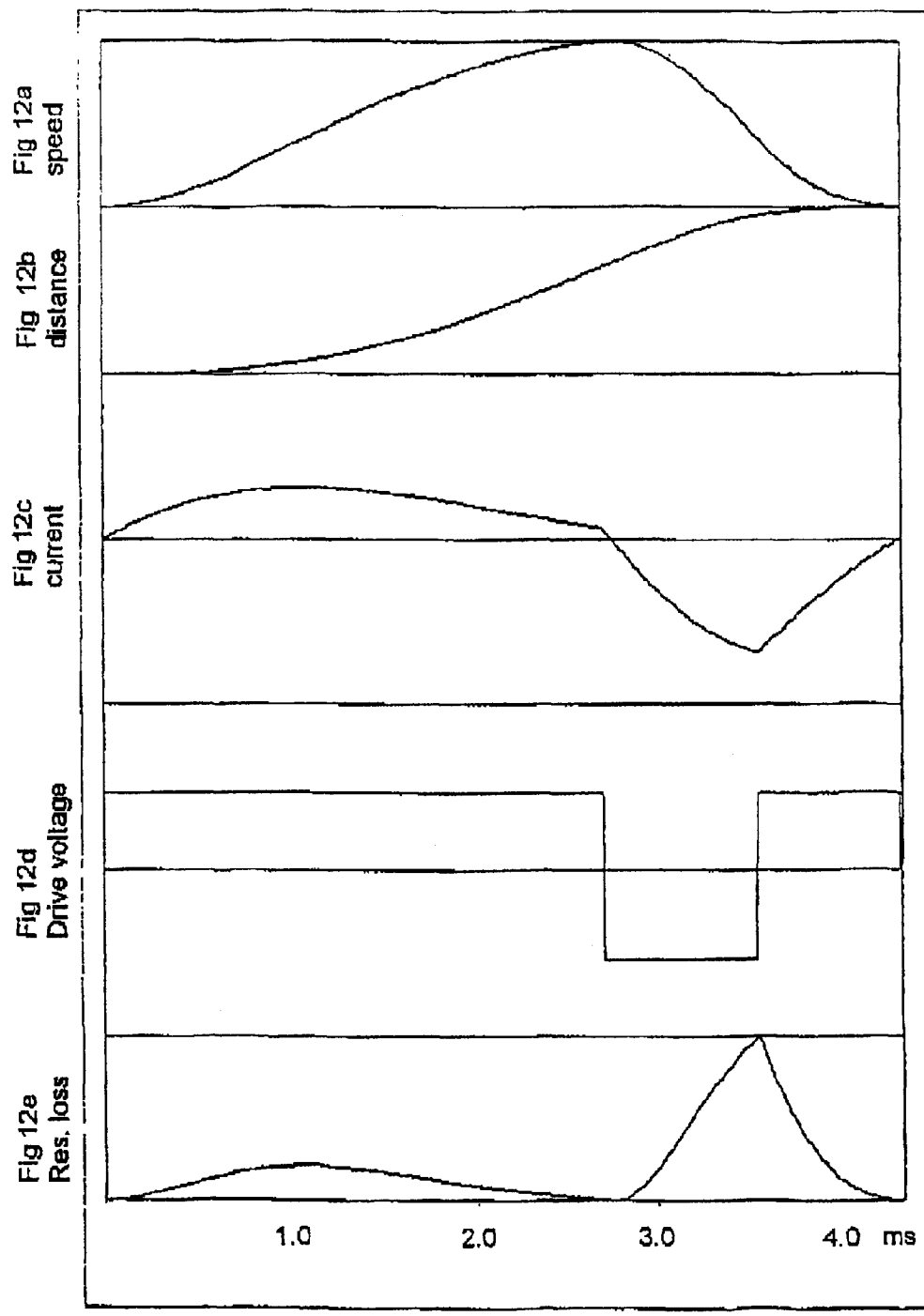
dist = 0.200 rad    t = 4.33ms    Loss = 41.89 mJ

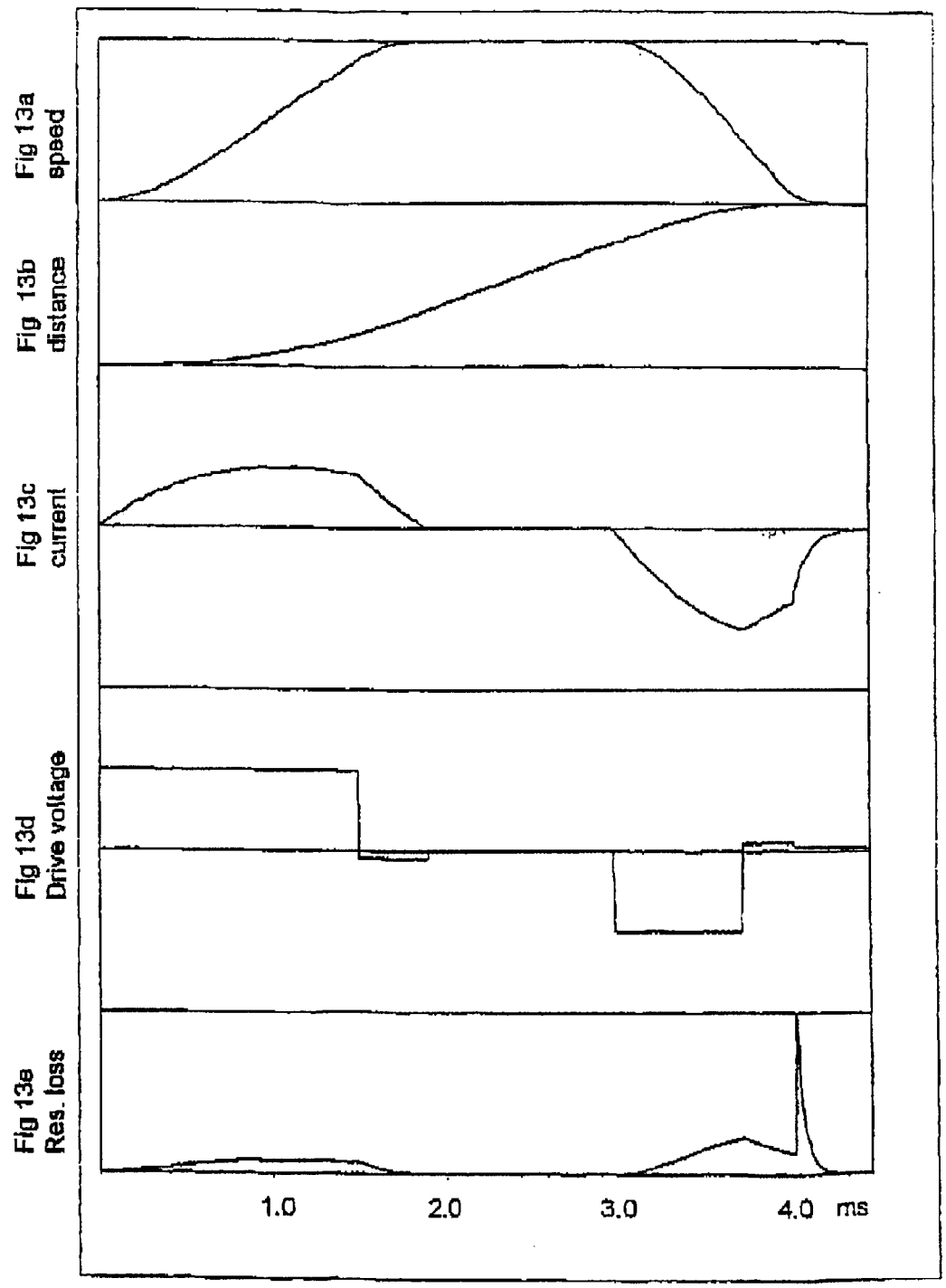

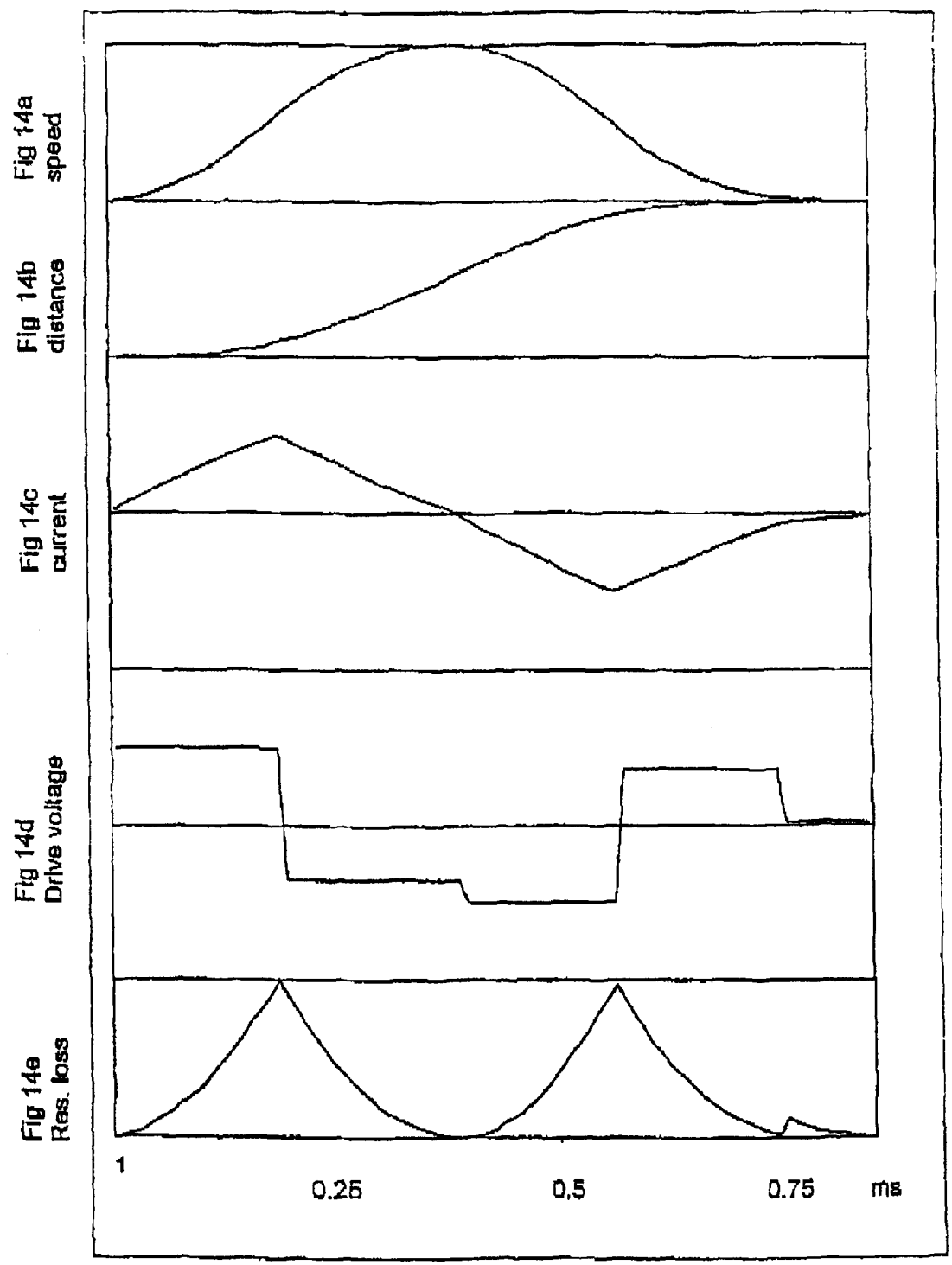
dist = 0.004 rad   t = 0.89ms   Loss = 0.31mJ

ELECTRIC MOTOR

This application is the national phase under 35 U.S.C. § 371 of PCT International Application No. PCT/SE00/00138 which has an International filing date of Jan. 2, 2000, which designated the United States of America and was published in English.

BACKGROUND OF THE INVENTION

1. Technical Field

The present invention relates to electric motors having a very limited rotation, for example in the range of about ±12° (degrees). Such motors are sometimes called galvanometers or rotary actuators.

2. Description of the Background Art

The dominating use of rotary actuators is in moving magnetic heads to a requested track in a hard disc drive. Most of such actuators use voice coil motors. Voice coil motors are, for example, used in the disc drive systems described in U.S. Pat. Nos. 5,329,267, 5,448,437, 5,459,362, 5,537,270 5,608,592, 5,621,591, 5,654,848 5,675,455, 5,694,272, 5,698,911, 5,883,761 and 5,914,836.

However, rotary actuators based on other principles than a voice coil have also been disclosed. The published Japanese patent application 61-154471 for Matsushita, inventor Yukihiro Ashizaki, discloses a disc head rotary actuator having six wound stator poles arranged in two sets of three poles. The three poles in a pole set are each driven by one of three currents 120° out of phase with each other. The stator seems to cover a mechanical sector of about 45°. The rotor seems to have several permanent magnet poles. The published Japanese patent application 61-124254 for Matsushita, inventor Hiroaki Taame, discloses a disc head rotary actuator having three wound rotor poles connected to different phases. The stator seems to cover a mechanical sector of about 45° and seems to have several permanent magnet poles.

U.S. Pat. No. 4,968,909 for Rand H. Hulsing, II discloses an actuator having two wound stator pole pairs in the centre and a soft magnetic rotor that can be attracted to either of the stator pole pairs. The motor is fully symmetric around the rotor shaft. There are three separate windings and no permanent magnets. In U.S. Pat. No. 5,270,594 a similar basic design is disclosed.

U.S. Pat. No. 5,025,201 for Alexander Berger discloses a resolver having a 10° range and a stator covering a sector of some 90°. There are no permanent magnets. As is normal for a resolver, there are two static and one moving phase winding, and the magnetic coupling between the moving and the static windings depends on the position of the rotor.

U.S. Pat. No. 5,038,062 for Manabu Shiraki discloses what can be described as an inverted voice coil arrangement. In the conventional voice coil arrangement a rotor having one or two flat coils located in the same plane moves in an air gap with an axial magnet field generated by two stator magnet sets. The magnets face a smooth back iron over a radial air gap that is approximately of the same length in the direction of flux as are the permanent magnets and the single or dual rotor coil(s) move in this air gap. The magnet sets are parallel to the rotor movement plane. Instead, in U.S. Pat. No. 5,038,062 a rotor with one magnet moves between two stator flat coil pairs parallel to the rotor movement plane. The rotor magnet causes an axial flux in the air gap, and the flat coils are inserted in this air gap. The four coils are connected to the same phase.

The published Japanese patent application 2-074143 for Fujitsu, inventor Hiroshi Maeta, discloses a design of a rotary actuator that also can be described as an inverted voice coil arrangement. The magnets are moving also in this design but the air gap flux is radial. Basically there are four moving magnets with equal sectors. Two of these are mounted in contact with each other and can be replaced by a single magnet covering a sector that is twice that of the two other magnets. Like the conventional hard disc voice coil motors, the coils are inserted in the air gap between the moving magnets and a smooth back iron. The basically two coils are static, and all coils are connected to the same phase. The published European patent application 0 127 058 for BASF, inventors Klaus Manzke et al., discloses a similar arrangement having two coils in the radial air gap between four magnets and a smooth back iron. The two coils are connected to the same phase.

The published German patent application 19 816 201 for Seiko Instruments, inventors Takashi Ishida et al., discloses a rotary actuator having a rotor carrying permanent magnets creating a flux in the radial direction. Around the rotor at least two ironless coils are arranged. The coils are either wound around a common non-magnetic structure (for example made of a thermoplastic) or wound one by one and inserted in slots in a nonmagnetic stator coil fixture. All coils are connected to the same phase. The stator and rotor are symmetric around the shaft and covers a 360° sector.

U.S. Pat. No. 5,557,152 for Raymond G. Gauthier discloses a rotary actuator having one or two coils in the stator. Both coils are connected to the same phase. The rotor carries one or two permanent magnets and the flux in the air gap is axial. The rotor also carries the back iron required by these magnets. Unlike the other single phase designs described above, there are stator poles made of a magnetically highly permeable material, and the stator coils are placed around these stator poles. The design shown uses a very large air gap (about 2.5 mm) to reduce the otherwise enormous cogging torque that is inherent in the design.

SUMMARY OF THE INVENTION

It is therefore an object of the invention is to provide a compact actuator having a high output power/loss ratio.

Another object of the invention is to provide a compact actuator using feedback and having a low total length.

Another object of the invention is to provide an actuator having a high flux density in the air gap. Assuming that all other factors are equal, a higher air gap flux density increases efficiency.

Another object of the invention is to provide an actuator having an air gap that does not contain any winding. An air gap without winding can be much thinner, thus permitting a higher air gap flux density.

Another object of the invention is to provide an actuator that combines a thin air gap with a very low cogging torque.

Another object of the invention is to provide an actuator comprising both a low inductance and a high motor constant and thus permitting a fast response.

Another object of the invention is to provide an actuator having both a low inductance and a high motor constant and thus permitting a fast response so that a low exciting voltage can create a fast current change resulting in a fast change of torque.

Another object of the invention is to provide an actuator system having both a low resistance, to permit low losses, and a short time constant, to permit a fast response.

Another object of the invention is to provide an efficient and compact actuator having a single phase winding and thus having a reduced required current bandwidth.

A single phase motor can in principle make a full step move with a single period of current change (as shown for example in conjunction with the discussion of FIGS. 13a–13e below), whereas a polyphase motor requires several periods (the motor shown in the cited Japanese application 61-124254 seems to require some 10 full periods for a full range step). A single phase motor can therefore perform faster and achieve more precisely controlled movements for a given inductance and excitation voltage.

Thus, generally an electromagnetic rotary actuator is driven or controlled by a single voltage. The actuator comprises a rotor which can move about an axis and which has a permanent magnet or permanent magnets comprising at least two pairs of radially located north-south poles. The actuator further comprises a stator having pole teeth carrying at least one winding, the pole teeth preferably have the same angular pitch as the pairs of north-south poles of the permanent magnet(s). An airgap is formed between facing surfaces of the permanent magnets and of the pole teeth, these facing surfaces being located close to each other to create a small airgap, which can be smaller than 0.5 mm and preferably smaller than 0.3 mm. The permanent magnets are arranged, so that the magnetic flux lines derived therefrom extend in the airgap substantially in a radial direction from or towards the axis. The airgap has a shape substantially corresponding to part of a cylindrical shell. The stator is made of a magnetically permeable material, in particular a soft-iron material, and always has at least three pole teeth. The at least one winding is applied around a central one of the pole teeth.

The actuator can comprise only three pole teeth and then the pole teeth can be arranged within an angle, taken from the axis, of at most somewhat more than a third of a full turn, in particular within an angle smaller than 140° or preferably smaller than 130°. In the case where the actuator comprises only five pole teeth the pole teeth can be arranged within an angle of at most somewhat more than half a full turn, in particular within an angle smaller than 225°.

Furthermore, the actuator can have other favourable dimensions. Thus, a first angular sector between the two outmost ends of the stator pole parts which face the air gap can be substantially equal or advantageously wider than the sum of the angular range of the rotor movement, i.e. the peak to peak movement of the rotor, and the angular sector between the two outmost ends of the rotor magnet pole parts facing the air gap. The angular sector between the two ends of a stator pole part facing the air gap can be longer than the sum of the peak to peak movement of the rotor and the angular sector from an end of the rotor magnet pole part facing the air gap and the nearest end of the adjacent rotor magnet pole part facing the air gap.

Also, the normally part-cylindrical surface of at least one stator pole part such as the outer-most pole part which faces the rotor magnet pole parts to create the air gap can have an adjusted shape to reduce the cogging torque of the actuator, for example, having a portion located outside of the part-cylindrical surface, to reduce cogging torque of the actuator.

Each of the stator poles carrying winding coils can have a reduced height in the axial direction at places of the stator pole where the winding coil is located, thereby permitting a portion of the stator pole located at the airgap and at a radially inner surface of the stator pole to be longer in the axial direction than a portion of the stator pole located inside the stator pole winding. This special design of the stator poles can also be used in many other conventional electromagnetic rotary machines such as controllable polyphase motors and step motors.

An electronic circuit suitable for driving a single phase rotary actuator such as those of the kind described herein but also of other devices of similar kinds, particularly an actuator having a long electric time constant, is then connected to a winding or windings of the actuator and has a resistance changer that is adapted to increase a resistance in series with the actuator winding or the series resistance of the actuator winding when a longer electric time constant is advantageous or required and to reduce the resistance in series with the actuator winding or the series resistance of the actuator winding when a short electric time constant is advantageous or required. The resistance changer can advantageously comprise a first bridge leg directly connected to a terminal of the actuator winding and a second bridge leg connected through a resistor to the same terminal of the actuator coil. Alternatively, the resistance changer can vary the impedance or resistance of a resistor of the type having controllable resistances such as MOSFETs.

Additional objects and advantages of the invention will be set forth in the description which follows, and in part will be obvious from the description, or may be learned by practice of the invention. The objects and advantages of the invention may be realized and obtained by the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, wherein:

FIG. 5a is a fragmentary view of only the actuator of FIG. 4;

FIG. 5b is a sectional view taken along the line A—A of FIG. 5a;

FIG. 6a is a fragmentary view similar to that of FIG. 5a of a hard disc drive head actuator having three stator poles only a central one of which carries a winding and has a reduced height where the winding is located;

FIG. 6b is a sectional view taken along the line A—A of FIG. 6a;

FIGS. 7a–7e are time diagrams of speed, position, current, voltage and resistive loss respectively for a long step for a voice coil motor, FIGS. 8a–8e are time diagrams of speed, position, current, voltage and resistive loss respectively for a short step for a voice coil motor;

FIGS. 12a–12e are time diagrams of speed, position, current, voltage and resistive loss respectively for a long step for the actuator shown in FIG. 9 using conventional electronic drive circuits;

FIGS. 13a–13e are time diagrams of speed, position, current, voltage and resistive loss respectively for a high speed, long step for the actuator shown in FIG. 9 using more complex electronic drive circuits;

FIGS. 14a–14e are time diagrams of speed, position, current, voltage and resistive loss respectively for a short step for the actuator shown in FIG. 9 using more complex electronic drive circuits;

DETAILED DESCRIPTION

Figure 1:
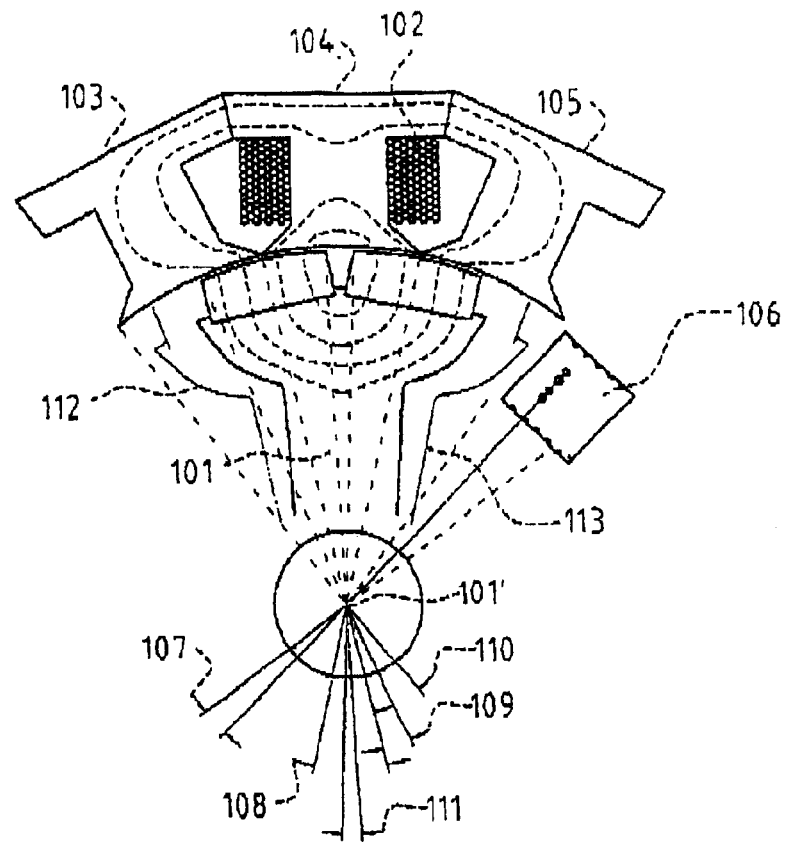
FIG. 1 is a schematic axial view of an electric rotary actuator having three stator poles, only one of which carries a winding, and an incremental encoder.
Figure 2:
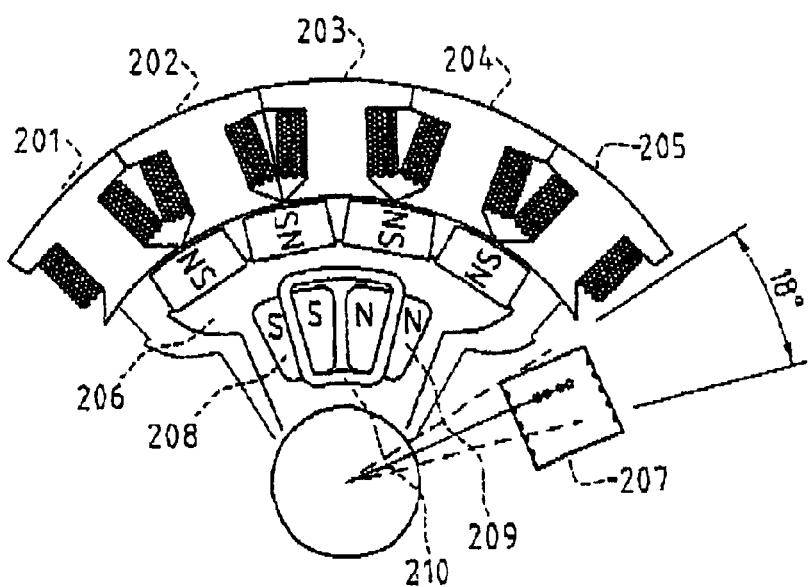
FIG. 2 is a view similar to that of FIG. 1 of an electric rotary actuator having five stator poles carrying windings, an analog tachometer and an incremental encoder.

In FIG. 1 a basic torque producing arrangement in an electric rotary actuator is shown. The rotor 101 is rotatable around an axis 101' and carries two permanent magnets at its peripheral surface. The rotor magnets are magnetised radially to have opposing polarities, as also shown in the embodiment of FIG. 2 to be discussed below. This means that if one permanent magnet has its north pole distant from the axis 101' the adjacent permanent magnet or magnets have their south pole located distant from the axis.

Three pole pieces 103, 104, 105 form a stator and they all have an identical shape, only the center pole carrying a winding or coil 102. The pole pieces have substantially a T-shape with a web portion projecting towards said axis and two arms joined to the web at the end thereof distant of the axis. Arms of adjacent pole pieces are joined to each other or abut each other. The low portion of the web, located closer to the axis carries small triangular peripheral projections, the free edges of these projections being located close to each other for adjacent pole pieces. The coil 102 is wound around a portion of the web of the central pole piece which has a uniform width, located between the arms and the triangular projections. Between the inner surfaces of the webs of the poles and the outer surface of the permanent magnets a narrow airgap is formed, which has the shape of thin part-cylindrical shell having a uniform thickness. Thus, the inner surfaces of the webs and the facing outer surfaces of the permanent magnets all have part-cylindrical shapes.

The permanent magnets can advantageously be made of a high energy material like FeNdB. The rotor magnet poles have the same angular pitch as the stator poles. In FIG. 1, the pitch 108 is 26°. The angular range of the movement 107 of the rotor from its centre position to any of its two end or extreme positions is 9°, i.e. its movement is from the centre position corresponding to 0° to the left end position at −9° and to the right end position at +9°. The angular half-width 109 of the magnet poles (10.6°) is larger than the maximum rotor displacement 107 (9°) from its centre position. Two consequences of these angular relations are of interest:

The stator poles cover a total sector of 3×26=78° and the rotor magnet poles only 10.6+26+10.6=47.2°. When the rotor is in its centre position there is a margin 110 of (78−47.2)/2=15.4° from the outmost ends of a stator pole to the outmost end of the adjacent rotor pole. As the maximum rotor movement 107 is 9° in either direction from the centre position, there will always be a sector of a stator pole on both sides of each rotor magnet. In FIG. 1 the two extreme rotor positions, i.e. its left-most and right-most positions, are indicated by the thin contour lines 112 and 113. This geometry reduces cogging torque.

The centre stator pole 104 will always face at least a small part of two rotor magnet poles. With the rotor 101 in the central position shown in FIG. 1, the total magnetic flux through the stator winding 102 will be zero as shown by the drawn flux lines. If the rotor 101 is turned clockwise, more and more flux will pass the centre leg of the centre and right poles 104 and 105 and thereby also through the single coil 102. In the clockwise extreme position, there will be no flux through the centre of left pole 103. The centre pole 104 (and its winding 102) will therefore obtain twice as much flux change for a given angular movement as will be obtained by the left and right poles 103 and 105.

The angular sector 108 between the two ends of a stator pole part facing the air gap (26°) is longer than the sum of the peak to peak movement (2 times item 107 or 18°) of the rotor and angular sector 111 (4.8°) from an end of the rotor magnet pole part facing the air gap and the nearest end of the adjacent rotor magnet pole part facing the air gap. A consequence of this is that the centre stator pole always faces parts of two rotor magnets. The doubling of the flux change caused by a rotor displacement therefore occurs over the whole movement span of the rotor (in the case of FIG. 1, over the angular movement range of 18°).

As there is no winding around poles 103 and 105, the winding around the central pole 104 can be made relatively larger.

By attaching an encoder disc segment, not shown, to the rotor 101, an optical receiver 106 sensing the position of the segment can give encoded signals from which the position of the device can be determined.

FIG. 2 shows another embodiment of a rotary actuator having five stator poles 201–205 of the same basic shape as in FIG. 1 which all carry windings. The rotor 206 then carries four permanent magnets, one less than the number of stator poles, the magnets having, as indicated above, alternating magnetization directions, as seen when passing peripherally over the rotor. For the rotor 206 being in the position shown, the total flux through the stator windings of poles 201 and 205 will be 50% of the maximum value and the flux through the three central poles 202–204 will be zero as already illustrated for FIG. 1. If the rotor 101 is turned clockwise, more and more flux will pass the centre leg of the right poles 202–205 and thereby also through the coils wound around these poles. In the clockwise extreme position, there will be no flux through the centre of the left pole 201 and 100% through the other poles 202–205. The central poles 202–204 (and their windings) will therefore obtain twice as much flux change (from 0 to 100%) for a given angular movement as will be obtained by the left-most pole 201 (from 50% to 0%) and the right-most pole 205 (from 50% to 100%).

An alternative to the embodiment of FIG. 2 is to only arrange windings around the three central poles 202–204. This will give a slightly higher copper loss for the same torque, but obviously lower winding costs:

TABLE 1

|  | 3 coils | 5 coils |
| --- | --- | --- |
| Resistance | 3 | 5 |
| Motor constant (kT) | 6(= 3 × 2) | 8(= 1 + 3 × 2 + 1) |
| Required current | 0.166666 | 0.125 |
| Cu loss | 0.083333 | 0.078125 |

(Coil resistance, torque and kT for the outer poles, the coil resistance and the output torque being normalized to 1.0 in Table 1)

By attaching an encoder disc segment, not shown, to the rotor 206, an optical receiver 207 sensing the position of the segment can give encoded signals from which the angular position of the rotor can be determined.

By adding two magnets 208 and 209 to the rotor 206 and placing a static coil 210 as shown with a static back iron, not shown, an analog tachometer signal can be obtained from which also the position of the rotor can be determined.

Figure 3:
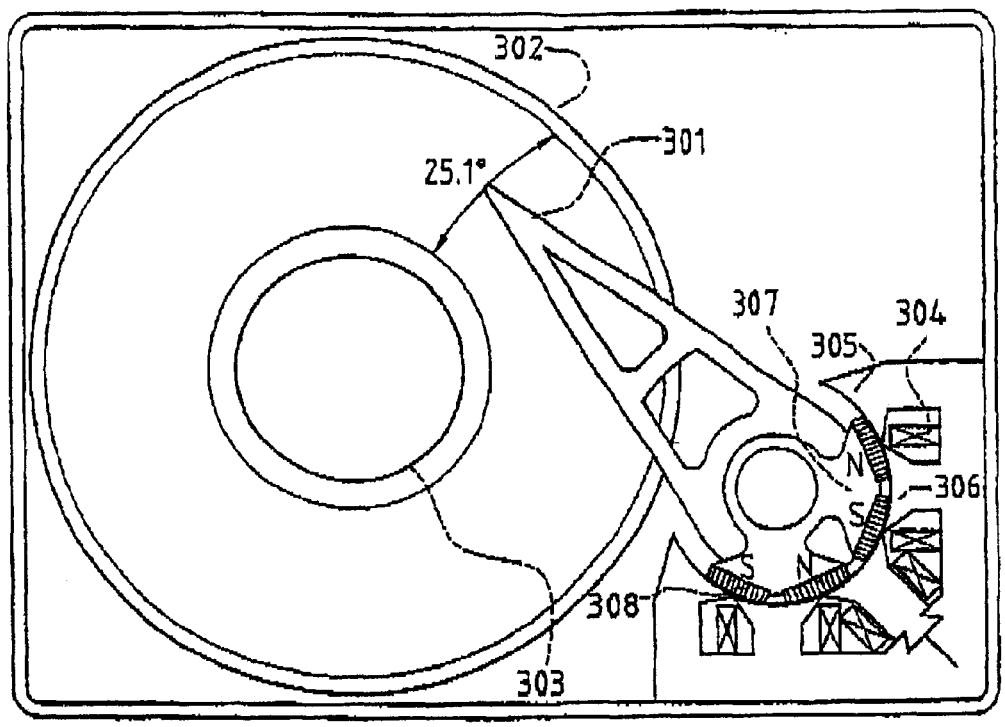
FIG. 3 is a schematic axial view of a hard disc drive head actuator having five stator poles only three of which carrying winding.

In FIG. 3 a hard disc drive head actuator is shown. The disc head(s) for reading/writing the tracks on the disc(s) are mounted at the point(s) of the arm(s) 301 which can sweep over a 25° sector that covers the active surface of the disc(s) 302. The disc rotates around a central motor 303. The arm is moved by a motor/actuator of the basic type as discussed above having five stator poles, the three central ones of which (like 306) carry windings and the two remaining external or outer poles (like 305) are unwound. There are thus three coils, one of the two cross sections of one coil is denoted by 304. The four permanent rotor magnets 308 are mounted on two soft-iron parts like 307 attached to the arm at the rotary axis thereof. The two unwound poles like 305 will reduce the stray flux from the coils of the wound stator poles.

Figure 4:
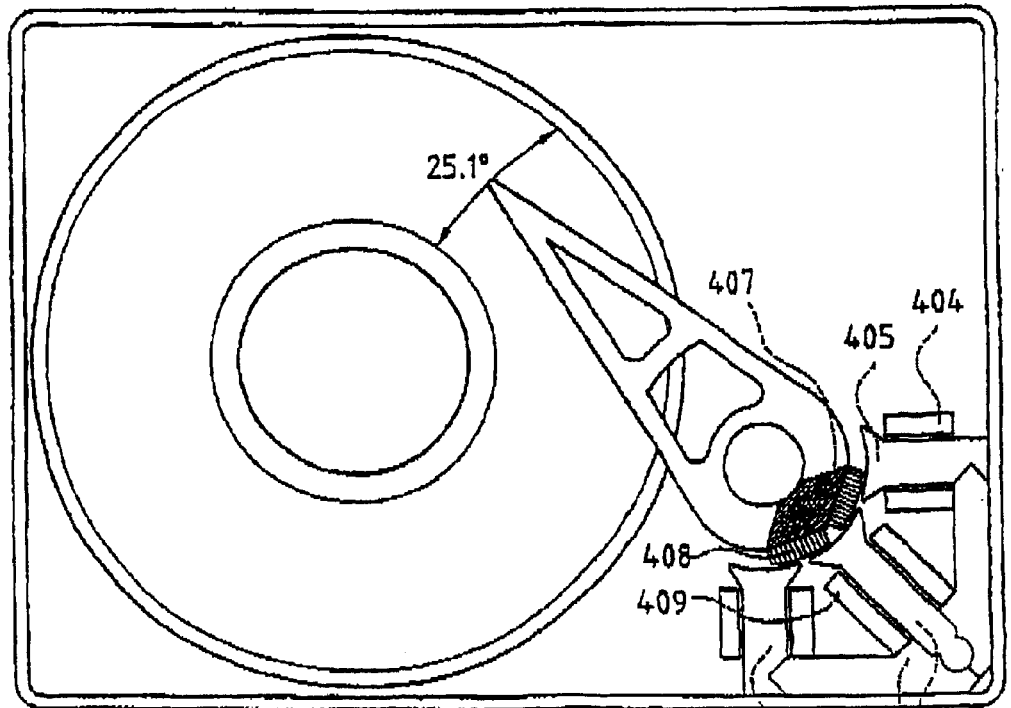
FIG. 4 is a view similar to that of FIG. 3 of a hard disc drive head actuator having three stator poles which all carry windings.

In FIG. 4 another embodiment of a hard disc drive head actuator is shown. The disc head arm is moved by a motor/actuator having three stator poles, two (405) of which are wound with a coil like 404 having a smaller cross-sectional area. The centre pole 406 is wound with a coil 409 having a larger cross-sectional area. As the flux change in the centre pole 406 is approximately twice that of the two other poles 405, it can be advantageous to have more winding turns in the centre coil 409 than in the coils like 404. In the embodiment shown in FIG. 4, the centre 409 coil has a cross-sectional area corresponding to 1.4 times the cross-sectional area of anyone of the side coils like 404, but can advantageously have a number of winding turns corresponding to 2.9 times the winding turns of each of the side coils. All three coils can be connected in series to be all energized by the same single-phase voltage.

The stator shown consists of five parts, the two side poles like 405, the centre pole 406 and two back iron parts like 410. This arrangement permits the poles 405–406 to be inserted into already wound coils. The five parts are then assembled together. The five parts can be made as laminations of punched electric steel, possibly using oriented steels.

In FIGS. 5a, 5b the actuator of FIG. 4 is shown in two projections. The permanent magnets 408 and soft magnetic parts like 407, 405, 410 and 406 all have the same height, the height being measured parallel to the rotational axis; the total height of the actuator is given by the coils like 409.

In FIGS. 6a, 6b two projections of another embodiment of a hard disc drive head actuator is shown. This embodiment has like the actuator of FIGS. 4–5b three stator poles one of which is wound and has a reduced height at the web portion where the winding is located. The two outer poles like 602 have the same height as the rotor magnets and the back iron 601. The outer parts of the wound pole has also the same height 611 as the rotor magnets and back iron 601, so that only the portion inside the coil 609 has a reduced height 610. The coil 609 is slightly higher than the height 611 of the permanent and soft iron parts to permit a direct contact with the top 613 and bottom 612 of the hard disc drive enclosure.

As the flux in the soft iron parts 602 of the stator will flow practically parallel to the plane of the upper projection, they can advantageously be made from laminated electric steel. The soft iron part 601 of the rotor can be solid. In the two parts 603 and 604, the flux moves in three dimensions and these parts can be made of compressed soft iron powder to reduce eddy currents. Alternatively, they can be made of laminated steel. Yet another alternative is to have the thinner part inside the coil made of a laminated FeCo-alloy and the outer parts of a soft iron metal powder.

The arrangement of FIG. 6 permits the use of a larger air gap flux, since it carries basically the same flux intensity but has a larger area due to the higher magnets, and a winding having a low resistance.

Conventional hard disc drives often use voice coil head actuators. Such actuators have a coil similar to the tachometer coil 210 shown in FIG. 2. The coil is rigidly connected to the disc head arm. There are two sets of magnets like 208 and 209, one set below and another set above the coil 210. The magnets are fixed to the hard disc chassis. The coil is therefore thermally insulated from the chassis by air gaps. A voice coil actuator from a 100×145×23 mm hard disc drive was partly disassembled and measured. The motor constant was measured to 0.139 Vs/radian, the voice coil inductance amounted to 3.7 mH and the coil resistance to 36.8 Ohms. The inertia of the rotor of the voice coil actuator was estimated to 19.0 g·cm$^2$ and the inertia of the disk head arm was assumed to be 19.5 g·cm$^2$.

FIGS. 7a–7e show time diagrams for the prior art disc drive motor described in the preceding paragraph. The actuator is assumed to be driven by a voltage of +11 V during acceleration and by −11 V during the retardation phase. The movement shown is large: 0.2 radians are close to half the total movement range of the disk head arm. The vertical scale of all FIGS. 7a–7e are normalised to the same peak-to-peak range. FIG. 7a shows the angular speed, FIG. 7b shows the angular distance travelled, FIG. 7c shows the actuator coil current where the thin horizontal line represents zero current, FIG. 7d shows the actuator coil voltage and FIG. 7e shows losses due to the resistance of the actuator coil and serial resistors such as 1103, 1104 or 1121 of FIGS. 11a, 11b or 11c to be described below.

FIGS. 8a–8e show similar diagrams for a short step of 0.004 radian (approximately 1% of the total movement possible) for the prior art disc drive actuator described above.

Figure 9:
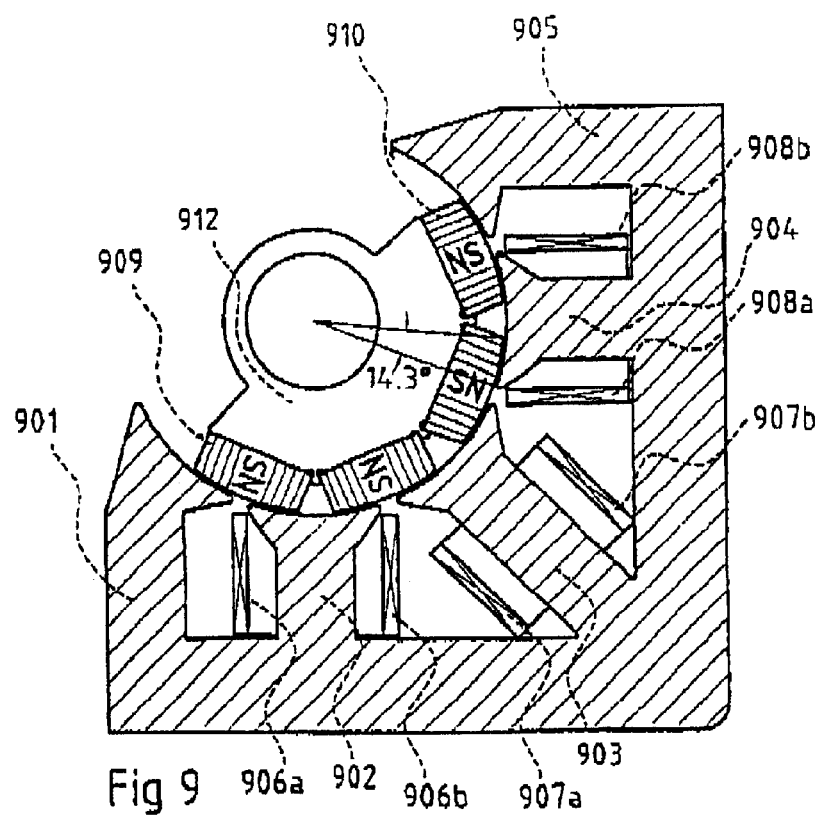
FIG. 9 is a sectional view of an electric rotary actuator having short rotor magnets and three thin stator coils that fits into a single piece stator of laminated steel having five stator poles two of which thus do not carry any winding.

FIG. 9 shows a hard disc drive head actuator similar to the one shown in FIG. 3. The motor/actuator has five stator poles, three of which 902–904 are wound and two of which 901 and 905 are unwound. Thus, there are three coils 906–908 shown as cross sections 906a–908b. The four permanent magnets such as 909 and 910 are mounted on a ferromagnetic (soft-iron) rotor support 912. The actuator has been designed for a 2×12.5° peak-to-peak movement range. As each permanent magnet has an angular extension of 14.3°, each of the three centrally located magnets will for any rotor position simultaneously face parts of two rotor magnets.

As the coils are thin, most of the height of the motor/actuator can be occupied by the laminated stator, thus permitting a relatively high rotor and high magnets and consequently a large torque constant. The coils can be lightly pressed between the upper and lower disc drive encasement, not shown, and the stator lamination, thus permitting a low thermal impedance between the coils and the disc drive chassis.

Figure 10:
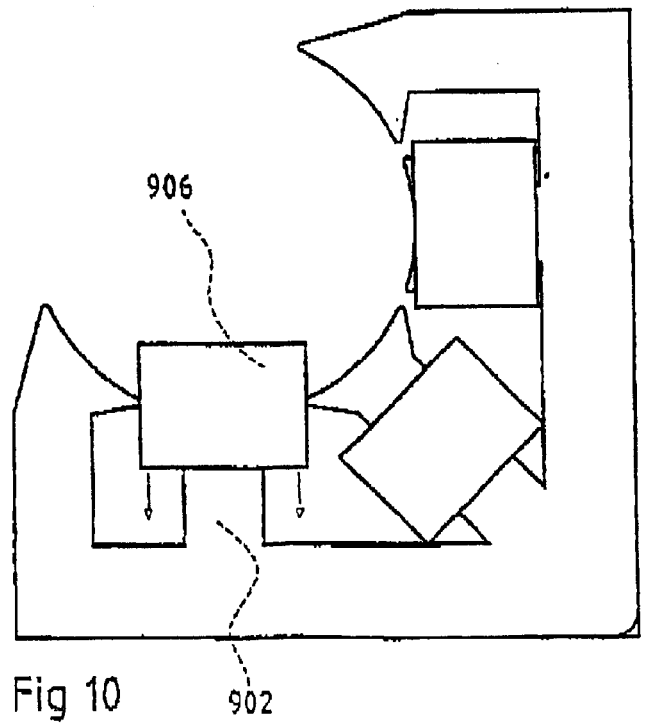
FIG. 10 is a schematic view similar to that of FIG. 9 showing the stator during assembly of the three coils.

Another advantage of using thin coils is that they can be inserted around a stator pole through the air gap between adjacent poles as illustrated in FIG. 10. This permits a low assembly cost. It also permits the production of the whole stator as one single laminated part or unit.

The windings of the actuator have been adjusted to give the same motor constant as for the voice coil actuator. The inductance then becomes 3.3 mH (slightly less than for the voice coil actuator) and the resistance 3.66 Ohm, less than 10% of that of the voice coil actuator. The rotor inertia is somewhat larger than that of the voice coil actuator, 27 g·cm².

Figure 11A:
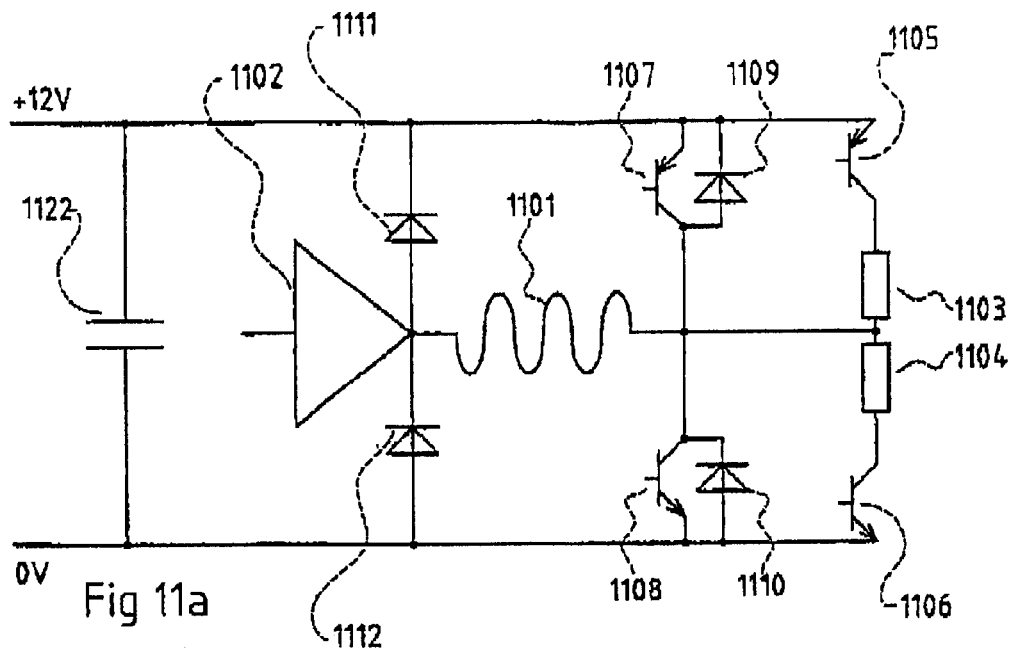
FIG. 11a is a circuit diagram of a partly linear control electronic system for an actuator according to FIG. 9.

In FIG. 11a a diagram of an example of an electronic circuit suitable to drive an actuator according to FIG. 9 is shown. The stator coils connected in series with each other are represented by the single coil 1101. A first end of the combined coil is connected to the output terminal of a linear amplifier 1102 delivering the current controlling the current in the coil for positioning the rotor of the actuator in accordance with the current The other, second end of the combined actuator coil is through a first resistor 1103 and a first switch 1105 connected a positive supply or drive voltage of e.g. 12 V and through a second resistor 1104 and a second switch 1106 connected the ground potential. The same end of the combined actuator coil is further through a third switch 1107 connected the positive supply voltage and through a fourth switch 1108 connected the ground potential. The third and fourth switches are connected in parallel with diodes 1109, 1110 respectively. The first end of the combined actuator coil is also connected to the supply voltage and the ground potential through diodes 1111, 1112 respectively. A capacitor 1122 connects the line carrying the supply voltage with the ground potential. The first and second switches 1105, 1106 can be called the high resistance switch set and the third and fourth switches 1107, 1108 together with their diodes 1109, 1110 connected in parallel can be called a low resistance switch set.

As the resistance of the actuator can be far lower than that of a voice coil motor the time constant is much longer. When the elements 1107–1110 are deactivated and one or both of the two switches 1105 and 1106 are activated, the two resistors 1103 and/or 1104 will be connected in series with the motor coil 1101. Thereby the total resistance can be increased to give a time constant similar to that of a voice coil motor, which simplifies control of the current to be delivered to the coil in the final phase of positioning the rotor of the actuator.

For the earlier stages of a movement a high motor resistance is only a disadvantage. During those phases, one of the switches 1107 or 1108 can be enabled. For example, a movement can be initiated by setting the linear amplifier output to +11.3 V and enabling switch 1108, thus giving some 11 V over the combined actuator coil 1101. The diodes 1111 and 1112 permit a slow decay of the current through the actuator if the linear amplifier 1102 is set to have a high impedance output stage; current driven by the actuator coil inductance can then pass for example the switch 1108 and the diode 1112, thus meeting a low voltage. An example of the operation is given in FIG. 13 which will be discussed below.

Figure 11B:
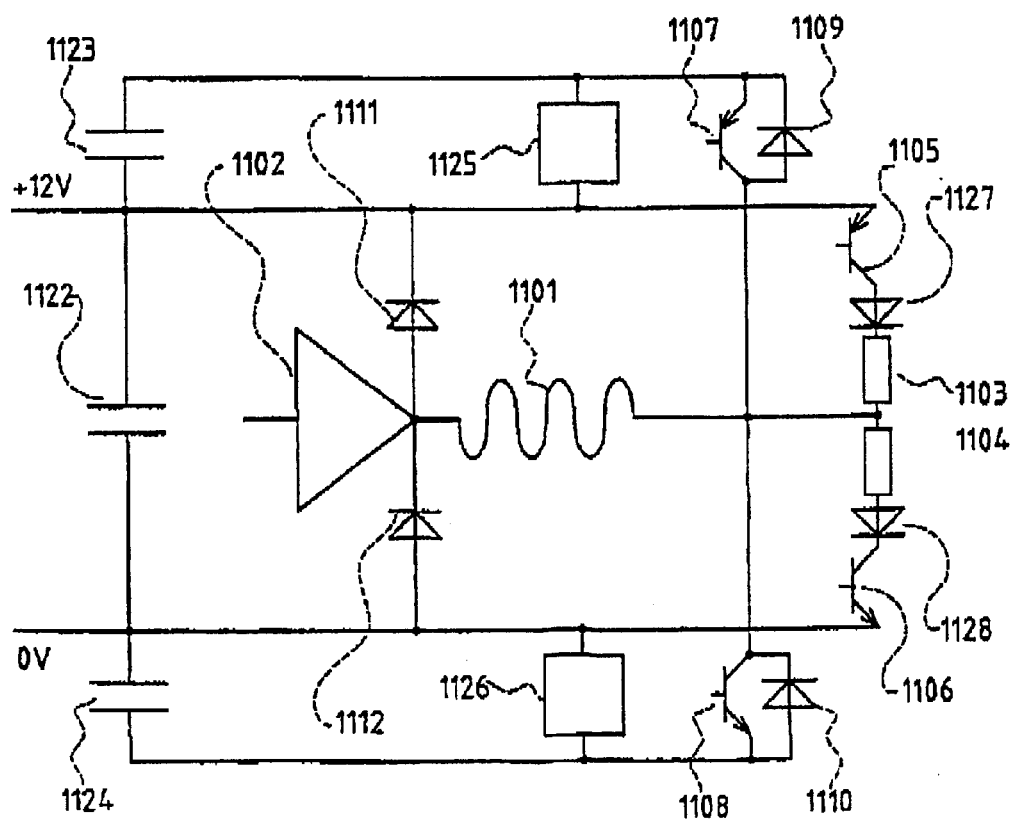
FIG. 11b is a circuit diagram of another partly linear control electronic system for an actuator according to FIG. 9.

FIG. 11b shows a diagram of another example of a switched electronic circuit suitable to drive an actuator of the kind illustrated in FIG. 9 using a higher voltage for the low resistance switch set. The higher voltage is generated by elements 1125 and 1126 which can be inductively or capacitively switched voltage multipliers. The first resistor 1103 and the first switch 1105 are here also connected in series with a diode 1127 and the second resistor 1104 and the second switch 1106 in series with a diode 1128. The special elements 1125, 1126 have first terminals connected to the supply voltage line and the ground potential line respectively. Their opposite, second terminals then have voltages being somewhat more positive or somewhat more negative than the supply voltage and the ground potential respectively. To these second terminals are the third and fourth switches 1107, 1108 and their associated diodes 1109, 1110 connected. The second terminals are also connected to the respective supply and ground lines through capacitors 1123, 1124. An example of the operation of the circuit of FIG. 11b will be given in conjunction with FIGS. 14a–14e as discussed below.

A large portion of the energy supplied to the actuator during acceleration will automatically be returned to the capacitors 1123–1124 during retardation, and the elements 1125 and 1126 must only supply the net loss. Thus, according to the simulation illustrated by the diagrams of FIGS. 14a–14e, 0.188 mC is taken from the capacitor 1124 and/or the supply 1126 during the acceleration phase (the first 180 μs). During the period from 580 to 750 μs, 0.164 mC is returned to the capacitor 1124. The net charge required is therefore only 0.024 mC. The net charge required from the capacitor 1123 is even less, only 0.003 mC.

Figure 11C:
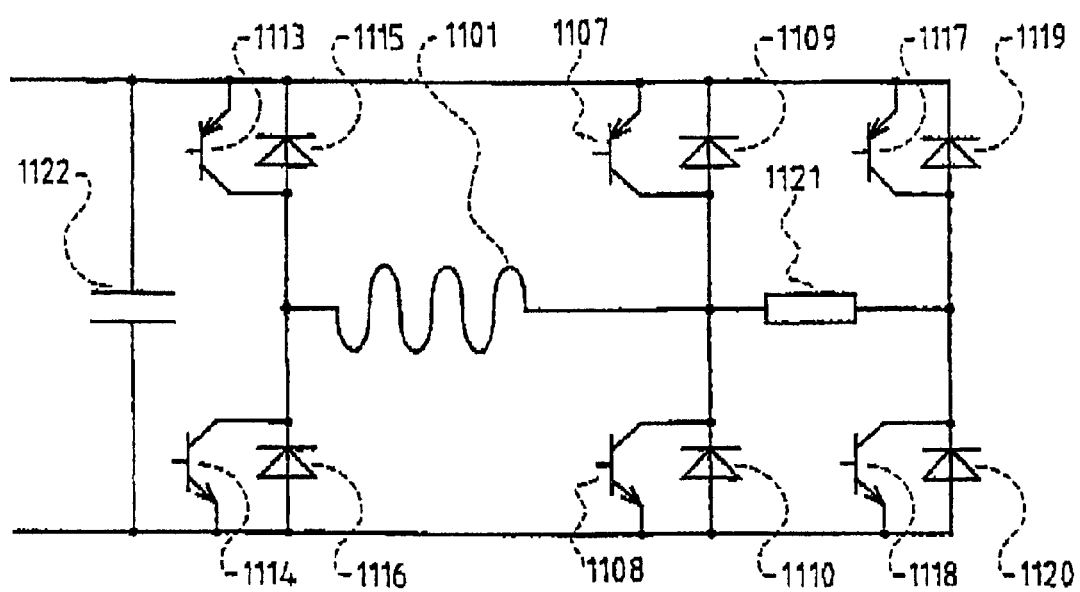
FIG. 11c is a circuit diagram of a switched control electronic system for a motor according to FIG. 9.

FIG. 11c shows a diagram of another example of a switched electronic system suitable to drive an actuator of the type shown in FIG. 9. It is generally a conventional H-bridge which has been modified by adding a series resistor and a switch set. As compared to the circuit diagram of FIG. 11a, the first and second resistors are here replaced by a single resistor 1121, which is thus at one end connected to the second of the coil 1101. The other end of the resistor is connected to the supply line through a combination of a switch 1117 connected in parallel with a diode 1119 and to the ground line through a combination of a switch 1118 connected in parallel with a diode 1120. The diodes 1115, 1116 in the lines connecting the first end of the coil 1001 to the supply line and the ground line are here connected in parallel with switches 1113, 1114.

For the earlier parts of a movement, one of the switches 1107 or 1108 can be enabled. For example, a movement can be initiated by enabling switches 1113 and 1108, thus giving almost the full supply voltage over the combined actuator coil 1101.

At the end of a movement, the time constant of the actuator can be increased by disabling the switches 1107, 1108 connected directly to the second end of the coil and enabling the switches 1117, 1118 connected to the same end through the resistor 1121. Assuming that the current is low enough, the voltage caused by the actuator coil current passing the resistor 1121 will be within the supply voltage of the circuit (in other cases one of the diodes 1109, 1110 will let current pass).

FIGS. 11*a*–11*c* only show examples of many possible alternative drive circuits. The switches shown have bipolar transistor symbols; obviously any fast switch can be used. The extra resistance used to reduce actuator time constant is shown as discrete resistors and switches; alternatively devices having a controlled resistance such as linear MOS-FETs can be used.

FIGS. 12*a*–12*e* show time diagrams for the actuator of FIG. 9 for the same step as that used for a voice coil actuator having the time diagrams of FIGS. 7*a*–7*e*. The actuator is run with a constant resistance. A possible driving circuit could then correspond to that of FIG. 11*a* with the components 1103–1106 removed. During the first approx 2.75 ms the driving voltage shown in FIG. 12*d* is positive. During the following phase (some 0.75 ms) the voltage is reversed and in the final phase it is restored to its former value. As can be seen, the actuator current, shown in FIG. 12*c*, and the speed, shown in FIG. 12*a*, reach zero at the same time. The time constants for the speed and current are however similar. As the speed is adjusted by the current, any servo adjustment of the speed close to the end of the movement would require a change in the current. The result would be that the speed could easily be set to zero at the right position, but if the current would then be different from zero, the resulting torque would rapidly move the rotor away from its required position. However, it can be observed that the step is done in 4.33 ms against 9.0 ms for the prior art voice coil actuator.

FIGS. 13*a*–13*e* show time diagrams for the actuator of FIG. 9 for the same step as that used for a voice coil actuator having the time diagrams of FIGS. 7*a*–7*e*. The diagrams illustrate the step time reduction which can be obtained using the actuator of FIG. 9 driven by the circuit shown in FIG. 11*a*. The actuator is in this case run with an added resistance during the final positioning phase. During the first 1.5 ms the driving voltage shown in FIG. 13*d* is positive, for example by having the linear power amplifier starting at +11.3 V and having the switch 1108 enabled. During the following phase (some 0.4 ms) the current is driven by the energy in the actuator inductance and passes the switch 1108 and the diode 1112. The actuator is accelerating even though no energy is supplied from the supply. This shows one of the advantages of providing a low resistance actuator coil. When the coil energy is exhausted, the system continues without any actuator current. Thereafter, the driving voltage is reversed and a negative current is increasing. The energy stored in this way is then used with another phase of low driving voltage, switch 1107 and diode 1111. During the final phase, an extra resistance is connected by enabling switches 1105 and 1106 and disabling the two switches 1107 and 1108. As can be seen, the actuator current and the speed reach zero at the same time. The time constant of the current is in this case much shorter. In the final phase, the time constant of the actuator is similar to that of the prior art voice coil motor, and should also permit the same ease of control as prior art voice coil motors. The driving voltage from the amplifier is only 0.5 V. This is arranged as a linear amplifier output of 6.5 V at the left end of the combined coil 1101 and 6.0 V in series with the parallel value of resistors 1103 and 1104 in the other end. It can be observed that the step is done in 4.5 ms against 9.0 ms for the prior art voice coil motor, that is half the time required for the prior art motor, whereas the total resistive losses are almost the same: 3.2 mJ for the step shown in the diagrams of FIGS. 13*a*–13*e* and 3.3 mJ for the voice coil motor step shown in the diagram of FIGS. 8*a*–8*e*.

FIGS. 14*a*–14*e* show time diagrams for the actuator of FIG. 9 for the same short step as that used for a voice coil actuator as illustrated by the diagrams of FIGS. 8*a*–8*e*, see the discussion of FIG. 11*b*.

The actuator as depicted in FIG. 9 has been laid out rather randomly, and its winding has been selected to have the same motor constant as that of a randomly selected prior art voice coil actuator. Depending on the driving policy used, it permits a significant reduction of step time or of power consumption. By adjusting the actuator design parameters to the required properties of the actuator system, the improvement in the most critical parameter can probably be far larger than what has been shown above.

Figure 15:
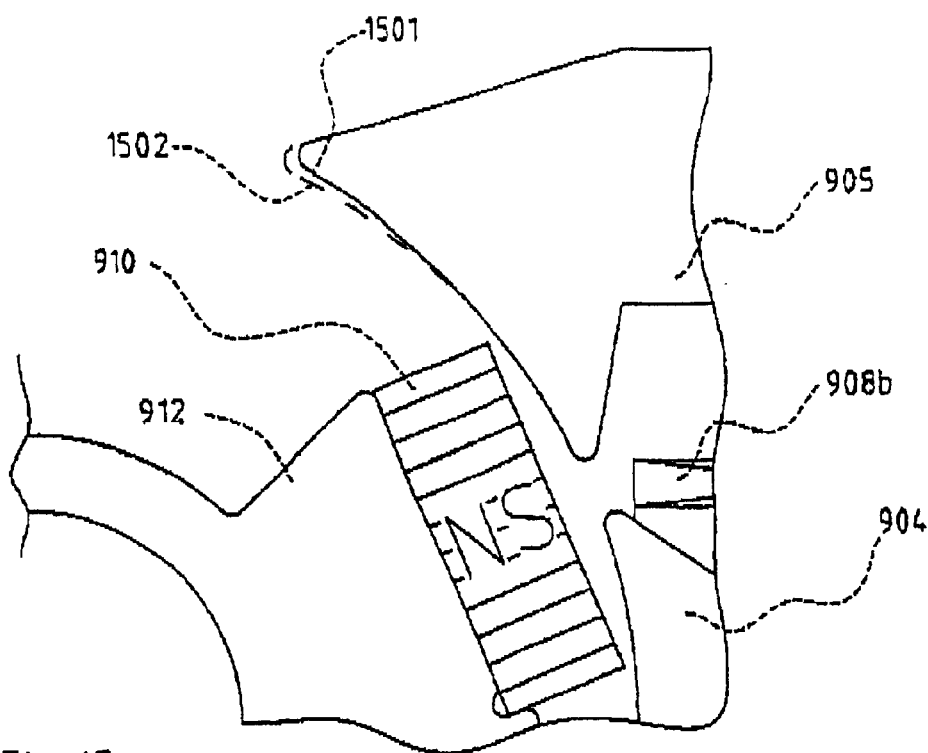
FIG. 15 is a fragmentary axial view of an actuator having rectangular section magnets and an arrangement to reduce cogging torques.

FIG. 15 shows a section through an actuator similar to that of FIG. 9 having non-cylindrical pole surfaces to reduce cogging torque. The surface 1501 of an outermost stator pole 905 (and 901) is non-cylindrical. The thin dotted line 1502 represents a cylindrical pole surface having the same radius as that of the adjacent, more centrally located pole 904. Thus, only the outermost portion, as seen in the peripheral direction, of the surface at the airgap has to be modified and this portion can be located a little radially outside the cylindrical surface extending through the surfaces of the centrally located stator poles and through the rest of the considered outermost stator pole. The air gap between the outermost pole 905 and the rotor magnet 910 will thereby different for different positions of the rotor. This shape will create a cogging torque that for a suitable shape of the surface 1501 will balance the cogging torque generated by the remaining system. By having a slightly different shape of the surface 1501 on pole 905 and the corresponding surface on pole 901 as of FIG. 9, a small, fairly constant torque can be obtained that in a no current state will overcome the friction and force the rotor to an end position resulting in an automatic parking of the disc drive head. This can be completed with a shape close to the parking end position permitting a torque close to this position sufficient to keep the disc drive head in the home position even in case of moderate shocks, for example during transports. The principle has been verified by simulations. Some 10 man-hours of work gave a system with a maximum cogging torque of some 0.5% of the actuator peak torque, and substantial improvements are likely if more work is invested.

FIG. 15 also shows magnets having a rectangular cross-section; it is often less expensive to produce such magnets than magnets having one side shaped as a circle segment as shown in the other figures. The rectangular shape gives a slightly lower torque. However, the arrangement to reduce cogging torque is applicable also for other-magnet shapes.

Figure 16:
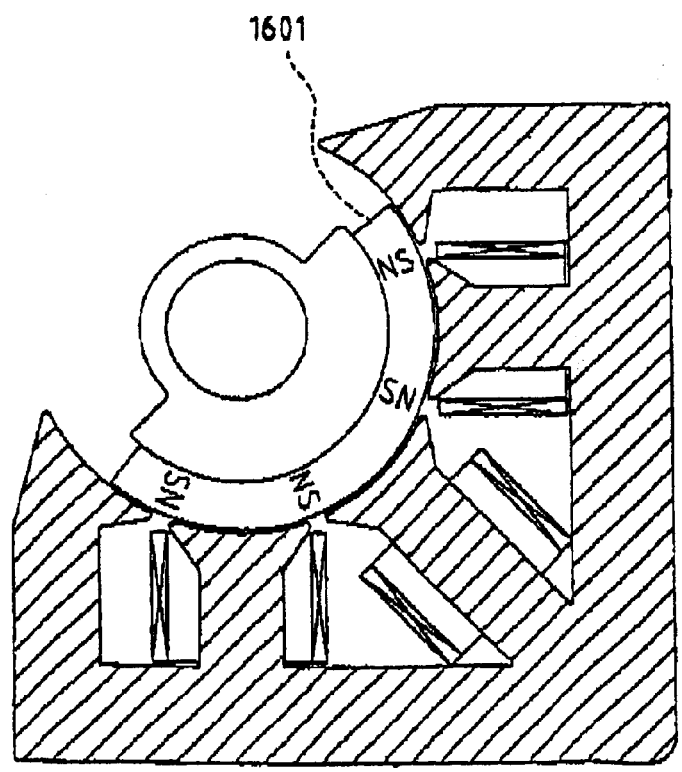
FIG. 16 a schematic view similar to that of FIG. 9 showing an actuator having five stator poles, two of which carry no windings, and a rotor carrying a single, specially magnetized permanent magnet having the shape of a cylindrical shell that is magnetised to have four magnet poles.

In FIG. 16 an actuator is shown which has the magnet poles integrated in a single cylinder segment magnet.

The hard disc head actuators of FIGS. 3, 4, and 9 permit the lower part of the actuator coils to be in direct contact with the hard disc chassis. The upper part of the coils can be in thermal contact with the hard disc outside case. As the chassis and the case often are made of aluminium, this permits a very low thermal resistance to the air outside the hard disc drive. This permits higher thermal loads for the coils than what can be accepted for the thermally insulated coil of a voice coil actuator. The torque available for a given copper loss is also significantly higher than for conventional voice coil actuators. Combined, this permits significantly faster head accelerations.

The actuators described above are compact and have a high output power/loss ratio, in particular as compared to conventional voice coil actuators. Even though the embodiment shown in FIG. 9 uses coils having a very thin cross section and has the same dimensions and the same motor constant as a conventional voice coil motor, the resistance is less than 10% of that of the voice coil motor. This permits more than three times more current at the same copper loss. The hard disc head actuators illustrated in FIGS. 3, 4 and 9 permit the upper and lower part of the actuator coils to be in direct contact with available heat sinks such as a hard disc chassis. This permits a very low thermal resistance to the ambient air. This permits higher thermal loads for the coils than what can be accepted for the thermally insulated coil of a voice coil actuator. Embodiments having a much larger coil cross section such as shown in FIG. 6 permit much higher torques for a given copper loss.

The actuators described above also have a high flux density in the air gap. Assuming that all other factors are equal, a higher air gap flux increases efficiency. As can be seen for example in FIG. 2, the flux will pass only a thin air gap; the remaining flux path consists of soft iron or permanent magnets.

Furthermore, actuators described above combine a thin air gap with a very low cogging torque. This is primarily obtained by the inherently magnetically balanced design and is further improved by the compensation arrangement described with reference to FIG. 15.

Also, the actuators described above have both a low inductance and a high motor constant thus permitting a fast response. The improvement over a voice coil motor is small at very small currents and increases with current. This results from the fact that much of the excitation voltage is lost in the resistive voltage over the high resistance of a voice coil motor.

The actuator systems as described above have both a low resistance giving low losses and a short time constant permitting a fast response, this being achieved when driving the actuators by the circuits depicted in FIGS. 11a–11c.

As is obvious for those skilled in the art, the invention can be modified in many ways. The number of poles can be increased. This will however increase the complexity and (for a given volume) reduce the air gap radius and the copper area of the coils. The rotor magnets can alternatively be placed on the periphery with the stator coils close to the centre. However, this will increase inertia.

While specific embodiments of the invention have been illustrated and described herein, it is realized that numerous additional advantages, modifications and changes will readily occur to those skilled in the art. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention.

What is claimed is:

1. An electromagnetic rotary actuator, controlled by a single voltage, comprising:
   a rotor movable about an axis and including at least one permanent magnet having magnet poles;
   a stator having at least one winding; and
   an airgap formed between facing surfaces of the at least one permanent magnet and of the stator,
   wherein the at least one permanent magnet is arranged to have flux lines extending in the airgap substantially in a radial direction from or towards the axis;
   wherein the stator has at least three pole teeth made of a magnetically permeable material, the at least one winding applied around a central one of the at least three pole teeth, and the at least three pole teeth having end surfaces forming the facing surfaces of the stator and thus facing surfaces of the at least one permanent magnet over the airgap;
   wherein the magnet poles of the at least one permanent magnet of the rotor and the at least three pole teeth all have the same angular pitch, and
   wherein the rotor has a peak to peak movement that is substantially less than 360 degrees about the axis.

2. The electromagnetic rotary actuator of claim 1, wherein the end surfaces of the at least three pole teeth are located close to the facing surfaces of the at least one permanent magnet creating an airgap smaller than 0.5 mm.

3. The electromagnetic rotary actuator of claim 1, wherein the end surfaces of the at least three pole teeth are located close to the facing surfaces of the at least one permanent magnet creating an airgap smaller than 0.3 mm.

4. The electromagnetic rotary actuator of claim 1, wherein
   at least three pole teeth have windings;
   all of said windings are connected to one single voltage source; and
   said at least three pole teeth having windings are centrally located.

5. The electromagnetic rotary actuator of claim 4, wherein said at least three pole teeth having windings are located around a central pole tooth.

6. The electromagnetic rotary actuator of claim 1,
   wherein the stator comprises exactly three pole teeth; and
   wherein the exactly three pole teeth are arranged within an angle, taken from the axis, of at most somewhat more than a third of a full turn.

7. The electromagnetic rotary actuator of claim 6, wherein the exactly three pole teeth are arranged within an angle smaller than 130°.

8. The electromagnetic rotary actuator of claim 1,
   wherein the stator comprises exactly five pole teeth; and
   wherein the exactly five pole teeth are arranged within an angle, taken from the axis, of at most somewhat more than half a full turn.

9. The electromagnetic rotary actuator of claim 8, wherein the exactly five pole teeth are arranged within an angle smaller than 225°.

10. The electromagnetic rotary actuator of claim 1, wherein the at least three pole teeth and/or the at least one permanent magnet are/is so arranged that by activating the at least one winding the rotor can move with a peak to peak movement only within a limited angular range about the axis.

11. The electromagnetic rotary actuator of claim 10, wherein a maximum of the limited angular range is substantially 25°.

12. The electromagnetic rotary actuator of claim 10, wherein the rotor has a maximum movement of at most substantially ±12.5° from a central position of the rotor.

13. The electromagnetic rotary actuator of claim 10, wherein the airgap has a shape substantially corresponding to part of a cylindrical shell.

14. The electromagnetic rotary actuator of to claim 10, wherein an angular sector extending between the two outermost ends of those portions of the at least three pole teeth that face the air gap is longer than the sum of the peak to peak movement of the rotor and an angular sector extending between the two outermost ends of the magnet poles of the at least one permanent magnet of the rotor facing the air gap.

15. The electromagnetic rotary actuator of claim 10, wherein an angular sector extending between the two outermost ends of those portions of the at least three pole teeth that face the air gap is substantially equal to the sum of the peak to peak movement of the rotor and an angular sector extending between the two outermost ends of the magnet poles of the at least one permanent magnet of the rotor facing the air gap.

16. The electromagnetic rotary actuator of claim 10, wherein an angular sector extending between the two ends of one of the at least three pole teeth that face the air gap is longer than the sum of the peak to peak movement of the rotor and an angular sector extending between an end of a part of one of the at least one permanent magnet of the rotor facing the air gap and the nearest end of an adjacent one of the at least one permanent magnet of the rotor facing the air gap.

17. The electromagnetic rotary actuator of claim 1, wherein a normally cylindrical surface angular sector of a part of at least one of the at least three pole teeth facing the magnet poles of the at least one permanent magnet over the air gap has a shape adapted to reduce the cogging torque of the electromagnetic rotary actuator.

18. The electromagnetic rotary actuator of claim 1, wherein the surfaces of those two outmost pole teeth of the at least three pole teeth that face the magnet poles of the at least one permanent magnet over the air gap have a shape adapted to reduce the cogging torque of the electromagnetic rotary actuator.

19. The electromagnetic rotary actuator of claim 1, wherein each of the at least three pole teeth that have said at least one winding has a reduced height in the axial direction at places of the pole tooth where said at least one winding is located, thereby permitting a portion of said pole tooth located at the airgap and at a radially inner surface of said pole tooth to be longer in an axial direction than a portion of said pole tooth located axially inside the at least one winding applied to said pole tooth.

20. The electromagnetic rotary actuator of claim 1, further comprising an electronic driver circuit connected to said at least one winding, said electronic driver circuit including a resistance changer to increase a resistance connected in series with said at least one winding when a longer electric time constant is advantageous or required and to reduce the resistance in series with said at least one winding when a short electric time constant is advantageous or required.

21. The electromagnetic rotary actuator of claim 1,
wherein the at least one winding is applied as individual coils around central ones of the at least three pole teeth; and
wherein all the coils of the at least one winding are connected to receive the same electrical phase.

22. The electromagnetic rotary actuator of claim 1, wherein the at least one permanent magnet has a number of magnet poles along its periphery that is one less than the number of pole teeth.

23. The electromagnetic rotary actuator of claim 1, wherein the angle between adjacent magnet poles of the at least one permanent magnet is larger than the maximum of the displacement of the rotor from a center position of the rotor.

24. The electromagnetic rotary actuator of claim 1, wherein the at least three pole teeth include only one wound pole tooth and only two unwound pole teeth.

25. The electromagnetic rotary actuator of claim 1, wherein the at least three pole teeth include only three wound pole teeth and no unwound pole tooth.

26. The electromagnetic rotary actuator of claim 1, wherein the at least three pole teeth include only three wound pole teeth and only two unwound pole teeth.

27. The electromagnetic rotary actuator of claim 1, wherein the at least three pole teeth include only five wound pole teeth and no unwound pole tooth.

28. The electromagnetic rotary actuator of claim 1, wherein the at least three pole teeth have web portions projecting towards the rotor, the web portions having at their ends facing the rotor triangular peripheral projections, the free edges of the triangular peripheral projections located close to each other for adjacent ones of the at least three pole teeth.

29. The electromagnetic rotary actuator of claim 28, wherein the gaps between the free edges of the triangular peripheral projections located close to each other for adjacent ones of the at least three pole teeth have widths allowing that a coil of the at least one winding can be inserted through the gaps to be positioned around a pole tooth.

30. An electromagnetic rotary actuator, controlled by a single voltage, comprising:
a rotor movable about an axis and including at least one permanent magnet having magnet poles;
a stator having at least one winding; and
an airgap formed between facing surfaces of the at least one permanent magnet and of the stator,
wherein the at least one permanent magnet is arranged to have flux lines extending in the airgap substantially in a radial direction from or towards the axis;
wherein the stator has at least three pole teeth made of a magnetically permeable material, the at least one winding applied around a central one of the at least three pole teeth, and the pole teeth having end surfaces forming the facing surfaces of the stator and thus facing surfaces of the at least one permanent magnet over the airgap; and
wherein the end surfaces of the pole teeth are located close to the facing surfaces of the at least one permanent magnet creating an airgap smaller than 0.3 mm.

31. The electromagnetic rotary actuator of claim 30, wherein
at least three pole teeth have windings;
all of said windings are connected to one single voltage source; and
said at least three pole teeth having windings are centrally located.

32. The electromagnetic rotary actuator of claim 30, wherein said at least three pole teeth having windings are located around a central pole tooth.

33. The electromagnetic rotary actuator of claim 30, wherein the magnet poles of the at least one permanent magnet of the rotor and the at least three pole teeth all have the same angular pitch.

34. The electromagnetic rotary actuator of claim 30, wherein the at least three pole teeth and/or the at least one permanent magnet are/is so arranged that by activating the at least one winding the rotor can move with a peak to peak movement only within a limited angular range about the axis.

35. The electromagnetic rotary actuator of claim 34, wherein a maximum of the limited angular range is substantially 25°.

36. The electromagnetic rotary actuator of claim 30, wherein a normally cylindrical surface angular sector of a part of at least one of the at least three pole teeth facing the magnet poles of the at least one permanent magnet over the air gap has a shape adapted to reduce the cogging torque of the electromagnetic rotary actuator.

37. The electromagnetic rotary actuator of claim 30, wherein the surfaces of those two outmost pole teeth of the at least three pole teeth that face the magnet poles of the at least one permanent magnet over the air gap have a shape adapted to reduce the cogging torque of the electromagnetic rotary actuator.

38. The electromagnetic rotary actuator of claim 31, wherein each of the at least three pole teeth that have said at least one winding has a reduced height in the axial direction at places of the pole tooth where said at least one winding is located, thereby permitting a portion of said pole tooth located at the airgap and at a radially inner surface of said pole tooth to be longer in an axial direction than a portion of said pole tooth located axially inside the at least one winding applied to said pole tooth.

39. The electromagnetic rotary actuator of claim 30,
wherein the at least one winding is applied as individual coils around central ones of the at least three pole teeth; and
wherein all the coils of the at least one winding are connected to receive the same electrical phase.

40. The electromagnetic rotary actuator of claim 30, wherein the at least, three pole teeth include only one wound pole tooth and only two unwound pole teeth.

41. The electromagnetic rotary actuator of claim 30, wherein the at least three pole teeth include only three wound pole teeth and no unwound pole tooth.

42. The electromagnetic rotary actuator of claim 30, wherein the at least three pole teeth include only three wound pole teeth and only two unwound pole teeth.

43. The electromagnetic rotary actuator of claim 30, wherein the at least three pole teeth include only five wound pole teeth and no unwound pole tooth.

44. An electromagnetic rotary actuator, controlled by a single voltage, comprising:
a rotor movable about an axis and including at least one permanent magnet having magnet poles;
a stator having at least one winding; and
an airgap formed between facing surfaces of the at least one permanent magnet and of the stator,
wherein the at least one permanent magnet is arranged to have flux lines extending in the airgap substantially in a radial direction from or towards the axis;
wherein the stator comprises exactly three pole teeth made of a magnetically permeable material, the at least one winding applied around a central one of the exactly three pole teeth, and the exactly three pole teeth having end surfaces forming the facing surfaces of the stator and thus facing surfaces of the at least one permanent magnet over the airgap; and
wherein the exactly three pole teeth are arranged within an angle, taken from the axis, of at most somewhat more than a third of a full turn.

45. The electromagnetic rotary actuator of claim 44, wherein the exactly three pole teeth are arranged within an angle smaller than 130°.

46. The electromagnetic rotary actuator of claim 44, wherein the magnet poles of the at least one permanent magnet of the rotor and the exactly least three pole teeth all have the same angular pitch.

47. The electromagnetic rotary actuator of claim 44, wherein the exactly three pole teeth and/or the at least one permanent magnet are/is so arranged that by activating the at least one winding the rotor can move with a peak to peak movement only within a limited angular range about the axis.

48. The electromagnetic rotary actuator of claim 44,
wherein the at least one winding is applied as individual coils around central ones of the exactly three pole teeth; and
wherein all the coils of the at least one winding are connected to receive the same electrical phase.

49. The electromagnetic rotary actuator of claim 44, wherein the at least one permanent magnet has exactly two magnet poles along its periphery.

50. The electromagnetic rotary actuator of claim 44, wherein the exactly three pole teeth include one wound pole tooth and two unwound pole teeth.

51. An electromagnetic rotary actuator, controlled by a single voltage, comprising:
a rotor movable about an axis and including at least one permanent magnet having magnet poles;
a stator having at least one winding; and
an airgap formed between facing surfaces of the at least one permanent magnet and of the stator,
wherein the at least one permanent magnet is arranged to have flux lines extending in the airgap substantially in a radial direction from or towards the axis;
wherein the stator comprises exactly five pole teeth made of a magnetically permeable material, the at least one winding applied around a central one of the exactly five pole teeth, the exactly five pole teeth having end surfaces forming the facing surfaces of the stator and thus facing surfaces of the at least one permanent magnet over the airgap; and
wherein the exactly five pole teeth are arranged within an angle, taken from the axis, of at most somewhat more than half a full turn.

52. The electromagnetic rotary actuator of claim 51, wherein the exactly five pole teeth are arranged within an angle smaller than 225°.

53. The electromagnetic rotary actuator of claim 51, wherein the magnet poles of the at least one permanent magnet of the rotor and the exactly least five pole teeth all have the same angular pitch.

54. The electromagnetic rotary actuator of claim 51, wherein the exactly five pole teeth and/or the at least one permanent magnet are/is so arranged that by activating the at least one winding the rotor can move with a peak to peak movement only within a limited angular range about the axis.

55. The electromagnetic rotary actuator of claim 51,
wherein the at least one winding is applied as individual coils around central ones of the exactly five pole teeth; and
wherein all the coils of the at least one winding are connected to receive the same electrical phase.

56. The electromagnetic rotary actuator of claim 51, wherein the at least one permanent magnet has exactly four magnet poles along its periphery.

57. The electromagnetic rotary actuator of claim 51, wherein the exactly five pole teeth include three wound pole teeth and two unwound pole teeth.

58. An electromagnetic rotary actuator, controlled by a single voltage, comprising:
a rotor movable about an axis and including at least one permanent magnet having magnet poles;
a stator having at least one winding; and an airgap formed between facing surfaces of the at least one permanent magnet and of the stator, wherein the at least one permanent magnet is arranged to have flux lines extending in the airgap substantially in a radial direction from or towards the axis;

wherein the stator has at least three pole teeth made of a magnetically permeable material, the at least one winding applied around a central one of the at least three pole teeth, and the pole teeth having end surfaces forming the facing surfaces of the stator and thus facing surfaces of the at least one permanent magnet over the airgap; and wherein the stator includes a substantial opening, in a circumferential plane, such that a portion of the rotor is exposed in the circumferential plane.

59. The electromagnetic rotary actuator of claim 58, wherein at least three pole teeth have windings included in the at least one winding;

all of said windings are connected to one single voltage source; and said at least three pole teeth having windings are centrally located.

60. The electromagnetic rotary actuator of claim 58, wherein the at least one winding is applied as individual coils around central ones of the at least three pole teeth; and wherein all the coils of the at least one winding are connected to receive the same electrical phase.

61. The electromagnetic rotary actuator of claim 58, wherein the angle between adjacent magnet poles of the at least one permanent magnet is larger than the maximum of the displacement of the rotor from a center position of the rotor.

62. An electromagnetic rotary actuator, controlled by a single voltage, comprising:

a rotor movable about an axis and including having at least one permanent magnet having magnet poles;

a stator having at least one winding; and an airgap formed between facing surfaces of the at least one permanent magnet and of the stator, wherein the at least one permanent magnet is arranged to have flux lines extending in the airgap substantially in a radial direction from or towards the axis;

wherein the stator has at least three pole teeth made of a magnetically permeable material, the at least three pole teeth having end surfaces forming the facing surfaces of the stator and thus facing surfaces of the at least one permanent magnet over the airgap;

wherein the at least one winding is applied as individual coils around central ones of the at least three pole teeth; and wherein all the coils of the at least one winding are connected to receive the same electrical phase.

63. The electromagnetic rotary actuator of to claim 62, wherein all end terminals of the coils are connected to each other.

64. The electromagnetic rotary actuator of to claim 62, wherein all the coils are connected in series with each other.

65. The electromagnetic rotary actuator of claim 62, wherein the end surfaces of the at least three pole teeth are located close to the facing surfaces of the at least one permanent magnet creating an airgap smaller than 0.5 mm.

66. The electromagnetic rotary actuator of claim 62, wherein the end surfaces of the at least three pole teeth are located close to the facing surfaces of the at least one permanent magnet creating an airgap smaller than 0.3 mm.

67. The electromagnetic rotary actuator of claim 62, wherein at least three pole teeth have windings;

all of said windings are connected to one single voltage source; and said at least three pole teeth having windings are centrally located.

68. The electromagnetic rotary actuator of claim 67, wherein said at least three pole teeth having windings are located around a central pole tooth.

69. The electromagnetic rotary actuator of claim 62, wherein the magnet poles of the at least one permanent magnet of the rotor and the at least three pole teeth all have the same angular pitch.

70. The electromagnetic rotary actuator of claim 62, wherein the at least three pole teeth and/or the at least one permanent magnet are/is so arranged that by activating the at least one winding the rotor can move with a peak to peak movement only within a limited angular range about the axis.

71. The electromagnetic rotary actuator of claim 70, wherein a maximum of the limited angular range is substantially 25°.

72. The electromagnetic rotary actuator of claim 70, wherein the rotor has a maximum movement of at most substantially ±12.5° from a central position of the rotor.

73. The electromagnetic rotary actuator of claim 70, wherein the airgap has a shape substantially corresponding to part of a cylindrical shell.

74. The electromagnetic rotary actuator of to claim 70, wherein an angular sector extending between the two outermost ends of those portions of the at least three pole teeth that face the air gap is longer than the sum of the peak to peak movement of the rotor and an angular sector extending between the two outermost ends of the magnet poles of the at least one permanent magnet of the rotor facing the air gap.

75. The electromagnetic rotary actuator of claim 70, wherein an angular sector extending between the two outermost ends of those portions of the at least three pole teeth that face the air gap is substantially equal to the sum of the peak to peak movement of the rotor and an angular sector extending between the two outermost ends of the magnet poles of the at least one permanent magnet of the rotor facing the air gap.

76. The electromagnetic rotary actuator of claim 70, wherein an angular sector extending between the two ends of one of the at least three pole teeth that face the air gap is longer than the sum of the peak to peak movement of the rotor and an angular sector extending between an end of a part of one of the at least one permanent magnet of the rotor facing the air gap and the nearest end of an adjacent one of the at least one permanent magnet of the rotor facing the air gap.

77. The electromagnetic rotary actuator of claim 62, wherein a normally cylindrical surface angular sector of a part of at least one of the at least three pole teeth facing the magnet poles of the at least one permanent magnet over the air gap has a shape adapted to reduce the cogging torque of the electromagnetic rotary actuator.

78. The electromagnetic rotary actuator of claim 62, wherein the surfaces of those two outmost pole teeth of the at least three pole teeth that face the magnet poles of the at least one permanent magnet over the air gap have a shape adapted to reduce the cogging torque of the electromagnetic rotary actuator.

79. The electromagnetic rotary actuator of claim 62, wherein each of the at least three pole teeth that have said at least one winding has a reduced height in the axial direction at places of the pole tooth where said at least one winding is located, thereby permitting a portion of said pole tooth located at the airgap and at a radially inner surface of said pole tooth to be longer in an axial direction than a portion of said pole tooth located axially inside the at least one winding applied to said pole tooth.

80. The electromagnetic rotary actuator of claim 62, further comprising an electronic driver circuit connected to said at least one winding, said electronic driver circuit including a resistance changer to increase a resistance connected in series with said at least one winding when a longer electric time constant is advantageous or required and to reduce the resistance in series with said at least one winding when a short electric time constant is advantageous or required.

81. The electromagnetic rotary actuator of claim 62, wherein the at least one permanent magnet has a number of magnet poles along its periphery that is one less than the number of pole teeth.

82. The electromagnetic rotary actuator of claim 62, wherein the angle between adjacent magnet poles of the at least one permanent magnet is larger than the maximum of the displacement of the rotor from a center position of the rotor.

83. The electromagnetic rotary actuator of claim 62, wherein the at least three pole teeth include only one wound pole tooth and only two unwound pole teeth.

84. The electromagnetic rotary actuator of claim 62, wherein the at least three pole teeth include only three wound pole teeth and no unwound pole tooth.

85. The electromagnetic rotary actuator of claim 62, wherein the at least three pole teeth include only three wound pole teeth and only two unwound pole teeth.

86. The electromagnetic rotary actuator of claim 62, wherein the at least three pole teeth include only five wound pole teeth and no unwound pole tooth.

87. The electromagnetic rotary actuator of claim 62, wherein the at least three pole teeth have web portions projecting towards the rotor, the web portions having at their ends facing the rotor triangular peripheral projections, the free edges of the triangular peripheral projections located close to each other for adjacent ones of the at least three pole teeth.

88. The electromagnetic rotary actuator of claim 87, wherein the gaps between the free edges of the triangular peripheral projections located close to each other for adjacent ones of the at least three pole teeth have widths allowing that a coil of the at least one winding can be inserted through the gaps to be positioned around a pole tooth.

89. An electromagnetic rotary actuator, controlled by a single voltage, comprising:
   a rotor movable about an axis and including at least one permanent magnet having magnet poles;
   a stator having at least one winding; and
   an airgap formed between facing surfaces of the at least one permanent magnet and of the stator,
   wherein the at least one permanent magnet is arranged to have flux lines extending in the airgap substantially in a radial direction from or towards the axis;
   wherein the stator has at least three pole teeth made of a magnetically permeable material, the at least one winding applied around a central one of the at least three pole teeth, and the at least three pole teeth having end surfaces forming the facing surfaces of the stator and thus facing surfaces of the at least one permanent magnet over the airgap; and
   wherein the at least three pole teeth and the magnet poles of the at least one permanent magnet are so arranged that when the rotor is in a position in which the center of one of the magnet poles faces the center of a gap between two adjacent ones of the at least three pole teeth, the center of at least one of the two adjacent magnet poles faces the center of the gap between two adjacent ones of the at least three pole teeth.

90. The electromagnetic rotary actuator of claim 89, wherein the at least three pole teeth and/or the at least one permanent magnet are/is so arranged that by activating the at least one winding the rotor can move with a peak to peak movement only within a limited angular range about the axis.

91. The electromagnetic rotary actuator of claim 89, wherein the at least one permanent magnet has a number of magnet poles along its periphery that is one less than the number of pole teeth.

92. The electromagnetic rotary actuator of claim 89, wherein the angle between adjacent magnet poles of the at least one permanent magnet is larger than the maximum of the displacement of the rotor from a center position of the rotor.

93. An electronic circuit for driving a single phase rotary actuator, the electronic circuit connectable to a winding or windings of the single phase rotary actuator, wherein a resistance changer increases a resistance in series with the winding or windings when a longer electric time constant is advantageous or required and to reduce the resistance in series with the winding or windings when a shorter electric time constant is advantageous or required.

94. The electronic circuit of claim 93, wherein the resistance changer comprises:
   a first bridge leg directly connectable to a terminal of the winding or windings; and
   a second bridge leg connectable through a resistor to the same terminal of the winding or windings.

95. The electronic circuit of claim 93, wherein the resistance changer varies the impedance of a resistor having a controllable resistance.

96. The electronic circuit of claim 93, wherein the resistor having a controllable resistance is a MOSFET.

* * * * *